US011165557B2

(12) United States Patent
Satpathy

(10) Patent No.: US 11,165,557 B2
(45) Date of Patent: Nov. 2, 2021

(54) ENCRYPTION ENGINE HAVING RANDOMIZED ROUND SCHEDULING TO PREVENT SIDE CHANNEL ATTACKS

(71) Applicant: Facebook Technologies, LLC, Menlo Park, CA (US)

(72) Inventor: Sudhir Satpathy, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 223 days.

(21) Appl. No.: 16/446,187

(22) Filed: Jun. 19, 2019

(65) Prior Publication Data

US 2020/0403771 A1     Dec. 24, 2020

(51) Int. Cl.
| | |
|---|---|
| *H04L 9/00* | (2006.01) |
| *H04L 9/06* | (2006.01) |
| *H04N 13/332* | (2018.01) |
| *G06F 15/78* | (2006.01) |
| *G06F 3/14* | (2006.01) |
| *G06F 21/76* | (2013.01) |

(52) U.S. Cl.
CPC ............... *H04L 9/003* (2013.01); *G06F 3/14* (2013.01); *G06F 21/76* (2013.01); *H04L 9/0631* (2013.01)

(58) Field of Classification Search
CPC ......... H04L 9/003; H04L 9/0631; G06F 3/14; G06F 21/76
See application file for complete search history.

(56) References Cited

U.S. PATENT DOCUMENTS

| | | | |
|---|---|---|---|
| 9,330,272 B2 * | 5/2016 | Koo | ..................... H04L 63/0861 |
| 2003/0223580 A1 * | 12/2003 | Snell | ..................... H04L 9/0631 380/28 |

(Continued)

FOREIGN PATENT DOCUMENTS

| | | |
|---|---|---|
| EP | 2793155 A1 | 10/2014 |
| WO | 2017/052980 A1 | 3/2017 |

OTHER PUBLICATIONS

"Security and Privacy Approaches in Mixed Reality: A Literature Survey"—Guzman et al, University of South Wales, Jun. 2018 https://arxiv.org/pdf/1802.05797.pdf (Year: 2018).*

(Continued)

*Primary Examiner* — Randy A Scott
(74) *Attorney, Agent, or Firm* — Shumaker & Sieffert, P.A

(57) ABSTRACT

In general, this disclosure describes encryption engines that shuffle data segments during decryption. By shuffling the data and using the resulting random permutation for decryption, the engines of this disclosure obfuscate hardware performance information that attackers might access and use in a side channel attack. In one example, an apparatus includes a decryption engine configured to select, for each round of multiple rounds for decrypting the block of encrypted data, a permutation of inputs to the decryption engine from multiple permutations of the inputs. The inputs include encrypted data segments of the block of encrypted data and an inverse cipher key segment, and the selected permutation of the inputs is different for at least two of the rounds. The decryption engine is further configured to iteratively compute a decrypted data segment across the plurality of rounds based on the respective selected permutation of the inputs for each round.

22 Claims, 13 Drawing Sheets

(56) References Cited

U.S. PATENT DOCUMENTS

| | | | |
|---|---|---|---|
| 2007/0071236 A1 | 3/2007 | Kohnen | |
| 2009/0168999 A1 | 7/2009 | Boswell et al. | |
| 2010/0153747 A1 | 6/2010 | Asnaashar et al. | |
| 2014/0351896 A1* | 11/2014 | Koo | G02B 27/017 726/4 |
| 2015/0222421 A1* | 8/2015 | Guo | G09C 1/00 380/28 |
| 2016/0203342 A1 | 7/2016 | Matsuo | |
| 2017/0092157 A1 | 3/2017 | Christiansen et al. | |

OTHER PUBLICATIONS

"Power Analysis Based Side Channel Attack"—Gamaarachchi et al, Department of Computer Engineering, Princeton University of Peradeniya, Jun. 2018 https://arxiv.org/pdf/1801.00932.pdf (Year: 2018).*

International Search Report and Written Opinion of International Application No. PCT/US2020/036144, dated Sep. 10, 2020, 12 pp.

Moradi et al., "Glitch-Free Implementation of Masking in Modern FPGAs," 2012 IEEE International Symposium on Hardware-Oriented Security and Trust, Jun. 3-4, 2012, pp. 89-95.

Kenney, "Energy Efficiency Analysis and Implementation of AES on an FPGA", A thesis presented to the University of Waterloo in fulfillment of the thesis requirement for the degree of Master of Applied Science in Electrical and Computer Engineering, Jan. 1, 2008, 84 pp.

U.S. Appl. No. 16/446,140, filed Jun. 19, 2019, by Satpathy.
U.S. Appl. No. 16/446,209, filed Jun. 19, 2019, by Satpathy.
U.S. Appl. No. 16/506,618, filed Jul. 9, 2019, by Atlas et al.
U.S. Appl. No. 16/597,591, filed Oct. 9, 2019, by Satpathy.

"Announcing the Advanced Encryption Standard (AES)," Federal Information Processing Standards Publication 197, Nov. 26, 2001, 51 pp.

Rouse, "Block Cipher," accessed from https://searchsecurity.techtarget.com/definition/block-cipher, last updated Jan. 4, 2006, 1 pp.

* cited by examiner

ENCRYPTION ENGINE HAVING RANDOMIZED ROUND SCHEDULING TO PREVENT SIDE CHANNEL ATTACKS

TECHNICAL FIELD

This disclosure generally relates to data encryption and decryption implemented in various types of computing systems.

BACKGROUND

Many computing systems, including those that receive content over networks, incorporate content protection or digital rights management technology that includes data decryption and encryption hardware and software. This encryption protects secure data, which is potentially sensitive, private, and/or right-managed and is stored or used on the system, from unauthorized access and exploitation.

SUMMARY

Devices that perform decryption are often standalone devices that are relatively portable and battery-powered, and are therefore relatively vulnerable to attack or snooping mechanisms that rely on gleaning information about the hardware functioning of these devices. An example of such an attack mechanism is a so-called "side channel attack" or SCA. SCAs exploit one or more of timing information, current (flow of charge) information, power consumption data, electromagnetic traces and leaks, emitted sounds, etc.

Some examples of devices that perform decryption for content protection include artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). Many user-facing artificial reality modalities, such as HMDs are battery powered, and are therefore often designed to incorporate low power operations. The low-power designs and portable nature of HMDs makes HMDs particularly vulnerable to SCAs, which are often performed using non-invasive, accessible, and relatively cheap off-the-shelf hacking equipment, such as SCA boards, trace analysis software, etc.

In general, this disclosure describes encryption engines that shuffle data segments during encryption and/or decryption, thereby obtaining a random permutation of the data segments to be used during encryption and/or decryption. By shuffling the data during encryption/decryption and using the resulting random permutation for encryption/decryption, the encryption engines of this disclosure obfuscate the power consumption information that attackers might access as part of an SCA. In some examples, the encryption engines of this disclosure perform intra-round shuffling of the input data within a reduced-sized encryption datapath configured to iteratively compute a portion of an encrypted block of data. The reduced-size encryption datapath may form the entire encrypted block of data by computing the portions of the encrypted block of data sequentially. This disclosure focuses on the decryption capabilities of these encryption engines, particularly for use in battery-powered devices such as HMDs of artificial reality systems, and the configurations of this disclosure are therefore described with respect to "decryption engines."

In one example, this disclosure is directed to an apparatus for data decryption. The apparatus includes an interface configured to receive an encrypted block of data. The apparatus further includes a decryption engine in communication with the interface. The decryption engine is configured to select, for each round of a plurality of rounds for decrypting the block of encrypted data, a permutation of inputs to the decryption engine from a plurality of permutations of the inputs. The inputs include encrypted data segments of the block of encrypted data and an inverse cipher key segment, and the selected permutation of the inputs is different for at least two rounds of the plurality of rounds. The decryption engine is further configured to iteratively compute a portion of a decrypted block of data across the plurality of rounds based on the respective selected permutation of the inputs for each round to form a decrypted data segment.

In another example, this disclosure is directed to an artificial reality system. The artificial reality system includes a decryption engine and a head-mounted display (HMD). The decryption engine is configured to select, for each round of a plurality of rounds for decrypting a block of encrypted data, a permutation of inputs to the decryption engine from a plurality of permutations of the inputs. The inputs include encrypted data segments of the block of encrypted data and an inverse cipher key segment, and the selected permutation of the inputs is different for at least two rounds of the plurality of rounds. The decryption engine is further configured to iteratively compute a portion of a decrypted block of data across the plurality of rounds based on the respective selected permutation of the inputs for each round to form a decrypted data segment. The HMD is configured to output artificial reality content that includes the decrypted data segment.

In another example, this disclosure is directed to a method of decrypting encrypted data. The method includes selecting, for each round of a plurality of rounds for decrypting a block of encrypted data, by a decryption engine, a permutation of inputs to the decryption engine from a plurality of permutations of the inputs, where the inputs include encrypted data segments of the block of encrypted data and an inverse cipher key segment, and where the selected permutation of the inputs is different for at least two rounds of the plurality of rounds. The method further includes iteratively computing, by the decryption engine, a portion of a decrypted block of data across the plurality of rounds based on the respective selected permutation of the inputs for each round to form a decrypted data segment.

In another example, this disclosure is directed to an artificial reality system. The artificial reality system includes an encryption engine and a head-mounted display (HMD). The encryption engine is configured to select, for each round of a plurality of rounds for encrypting a block of input data, a permutation of inputs to the encryption engine from a plurality of permutations of the inputs. The inputs include data segments of the block of input data and a cipher key segment, and the selected permutation of the inputs is different for at least two rounds of the plurality of rounds. The encryption engine is further configured to iteratively compute a portion of an encrypted block of data across the plurality of rounds based on the respective selected permutation of the inputs for each round to form an encrypted data segment. The HMD is configured to output the encrypted data segment.

The encryption engines and decryption engines of this disclosure shuffle and permute the input data to obfuscate hardware performance information that an SCA analysis device might surreptitiously obtain from an HMD or other user-facing artificial reality device. Moreover, the decryption engines of this disclosure maintain standard-compliant data output while thwarting SCAs on the decryption process. In this way, the decryption engines of this disclosure improve data security while maintaining data precision. The techniques of this disclosure may be implemented in various types of hardware, such as a system on a chip (SoC), in an application specific integrated circuit (ASIC), or in a field-programmable gate array (FPGA). The decryption engines of this disclosure provide data security improvements when implemented in user-facing artificial reality devices, as one non-limiting example.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Many content provider systems, such as streaming systems, incorporate content protection or digital rights management technology that includes data encryption. The digital data encryption implemented by content provider systems may follow various standardized encryption mechanisms. The content consuming devices that receive the encrypted content perform generally reciprocal or "inverse" steps with respect to the encryption mechanisms, in accordance with the inverse steps specified in the corresponding standard according to which the data was encrypted. This disclosure primarily describes decryption-side functionalities performed by content consuming devices configured according to aspects of this disclosure. It will be appreciated, however, that aspects of this disclosure provide benefits when implemented with respect to encryption-side functionalities of digital content protection, as well.

Figure 1A:
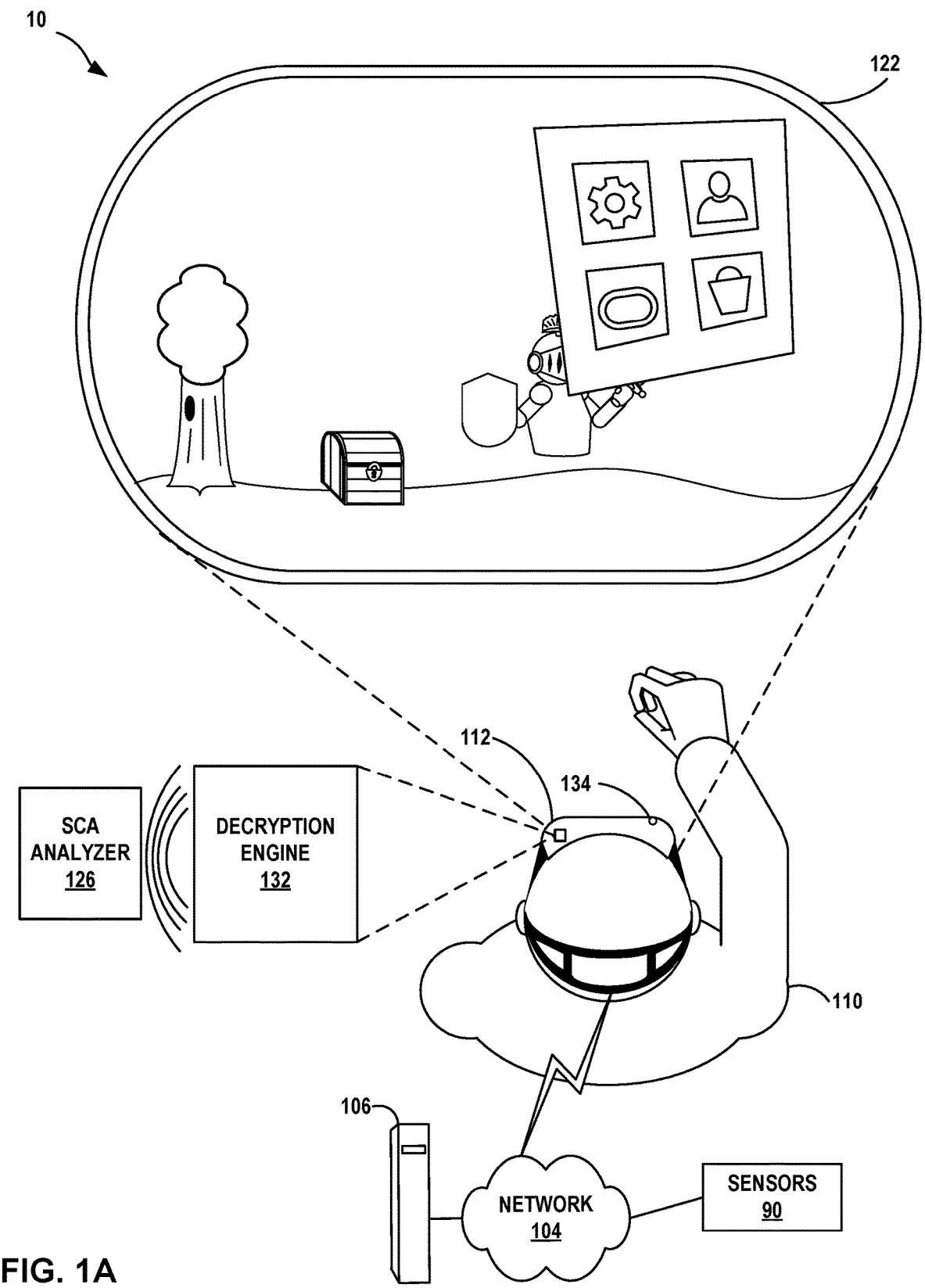
FIG. 1A is an illustration depicting an example artificial reality system that implements data-shuffled decryption, in accordance with aspects of this disclosure.

FIG. 1A is an illustration depicting an example artificial reality system 10 that decrypts encrypted digital content using data-shuffling (or "data-scrambling") in the decryption process, in accordance with aspects of this disclosure. In some examples, artificial reality system 10 uses a reduced decryption datapath, in which one or more portions (words) of an overall decryption key are applied to decrypt input data serially rather than application of the entire key to the input data in parallel. Moreover, as described herein, artificial reality system 10 performs data shuffling operations of this disclosure within the reduced datapaths while applying the various portions of the decryption key. By shuffling the data during the decryption process and simultaneously adhering to the pertinent decryption standard, artificial reality system 10 obfuscates the data that might be available to SCA hackers, and therefore improves data security (by thwarting SCAs), while maintaining decryption integrity. By using a reduced decryption datapath, artificial reality system 10 also reduces the overall hardware infrastructure needed for data decryption, in turn enabling smaller form factors and alleviating power needs.

Artificial reality system 10 is described herein as complying with the standardized decryption mechanisms described in the advanced encryption standard (AES) established by the United States National Institute of Standards and Technology (NIST) as a non-limiting example. It will be appreciated that artificial reality system 10 may, in other examples, implement the data-shuffling enhancements of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The data-shuffling techniques of this disclosure can be implemented in digital logic, and are therefore sufficiently generic to provide SCA mitigation in various types of decryption engines, such as those that comply with the standards listed above and other standardized or non-standardized decryption engines, such as in artificial reality systems on a chip (SoCs).

While the SCA-thwarting decryption techniques of this disclosure are described with respect to being implemented within artificial reality system 10 as an example, it will be appreciated that the applicability of the decryption techniques of this disclosure are not limited to artificial reality systems. The decryption techniques of this disclosure or reciprocal encryption techniques may be implemented to improve data security in other types of computing devices, including, but not limited to, various types of battery-powered SoC-driven and/or application specific integrated circuit (ASIC)-driven technologies. The low-power design of various SoCs, such as artificial reality SoCs are particularly vulnerable to SCAs because artificial reality SoCs often process user-confidential information (e.g., personal data, biometrics, user specific models, etc.) thereby making artificial reality SoCs attractive hacking targets for the surreptitious acquisition of high value assets. For example, SCAs may extract secret key (e.g., inverse cipher key) information by conducting and statistically analyzing current traces or electromagnetic (EM) traces.

Additionally, unlike cloud/server platforms in which large overall system power consumption tends to obfuscate encryption/decryption-related switching activity, artificial reality platforms are often power optimized to prolong battery life. The power consumption statistics of artificial reality platforms are not well-hidden by other power-consuming functions, and for this reason, artificial reality systems, particularly HMDs, expose a broader attack surface by making it easier for an attack device, such as SCA analyzer 126 of FIG. 1A, to isolate decryption-related power consumption and analyze the power consumption statistics. The non-invasive nature of and the relatively easy access to SCA-driven hacking equipment further exacerbates the vulnerability of artificial reality HMDs. One or more elements of artificial reality system 10 implement data shuffling during decryption, thereby obfuscating the power consumption metrics that are available to SCA hacking equipment such as SCA analyzer 126, and thereby reducing or potentially even fully scrambling the attack surface of these components of artificial reality system 10.

Because SCA-driven hacking equipment typically obtains the secret key for protected content by "sniffing" current leakage information externally, previous SCA-protection measures have focused on adding hardware components that introduce signals that obfuscate or hide the current leakage. Such additional hardware infrastructure is not well-suited to power-optimized battery-powered devices, due to the added energy consumption. This disclosure describes configurations that enable decryption engines to obfuscate the current leakage information by shuffling the data being decrypted prior to each iteration of decryption, thereby introducing unpredictability to the current information that is leaked and sniffed by SCA-driven hacking equipment such as SCA analyzer 126, such that the hacking equipment cannot surmise the secret key from analyzing the scrambled sequencing of the resulting current leakage information.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of HMD 112. HMD 112 may include one or more image capture devices 134, e.g., cameras, line scanners, and the like. Image capture devices 134 may be configured for capturing image data of the surrounding physical environment. In this example, console 106 is shown as a single computing device, such as a gaming console, workstation, a desktop computer, or a laptop.

In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as a WiFi® or 5G® based network, an Ethernet® network, a mesh network or a short-range wireless (e.g., Bluetooth®) communication medium. Although HMD 112 is shown in this example as being in communication with (e.g., tethered to or in wireless communication with) console 106, in some implementations HMD 112 operates as a standalone, mobile artificial reality system. During operation, the artificial reality application constructs artificial reality content 122 for display to user 110 by tracking and computing pose information for a frame of reference, typically a viewing perspective of MD 112. Artificial reality system 10 may use external sensors 90, external cameras 102, etc. to capture 3D information within the real world, physical environment.

According to aspects of this disclosure, artificial reality system 10 incorporates technology that shuffles the data being decrypted, prior to reconstructing, rendering, and presenting the decrypted content to user 110. Artificial reality system 10 is described herein as incorporating reconfigurable decryption engine 132 in HMD 112. Using the data-shuffled decryption techniques of this disclosure, decryption engine 132 may obfuscate or jumble the power consumption statistics that a hacking device such as SCA analyzer 126 might glean from HMD 112 during an SCA, making it more difficult or potentially even impossible for the hacking device to extrapolate security key information from HMD 112.

In some examples, decryption engine 132 is configured in accordance with aspects of this disclosure to decrypt encrypted data by iterating a reduced decryption datapath that accepts serialized data segments formed by splitting an original input block. For example, decryption engine 132 may iteratively decrypt each data segment in a number of rounds, where each round includes four cycles during which a different four-byte word is processed, with a fifth round being dedicated to randomly (or pseudorandomly or otherwise) selecting the key segment to be applied for the next round. Decryption engine 132 randomly shuffles the cycle order in which the words are processed for each round. Because the data segments can be decrypted in a non-interdependent manner with respect to one another, decryption engine 132 may decryption of the entire block in serial, sequential fashion, while using the same reduced hardware datapath. That is, by invoking a reduced hardware datapath serially in multiple iterations, decryption engine 132 reduces hardware infrastructure needs while maintaining AES compliance with respect to the decrypted output data.

Decryption engine 132 shuffles the data segments within each decryption iteration or round. In accordance with these examples, decryption engine 132 leverages non-interdependency between any two of the data segments, such that no single decryption iteration/round has any data interdependency with respect to any other decryption iteration/round in the serialized sequence. As such, decryption engine 132 improves data security and resistance to SCAs by shuffling data segments that are decrypted sequentially along the reduced datapath.

The data-shuffling configurations of this disclosure call for relatively low redesign effort and relatively low additional logic overhead. As such, decryption engine 132 may implement the SCA-mitigation measures of this disclosure without requiring significant changes to the overall infrastructure of HMD 112. As such, decryption engine 132 may be configured to implement the SCA-mitigation measures of this disclosure without significantly affecting the wearability of HMD 112, which may take the form factor of headsets or glasses, or of portable implementations of console 106 in examples in which decryption engine 132 is included in console 106. Because the SCA-mitigation configurations of decryption engine 132 also leverage a reduced datapath that decrypts data segments sequentially, decryption engine 132 also enable HMD 112 to operate under stringent power budgets, which is often a constraint in the context of battery-powered devices, such as HMD 112 or other wearable and/or portable devices of artificial reality systems.

While shown in FIG. 1A and described above as being included in HMD 112, decryption engine 132 may be included in console 106 in some examples. In these examples, console 106 invokes decryption engine 132 to decrypt encrypted data received over network 104, renders the decrypted data, and communicates the decrypted content to HMD 112 for display to user 110. The data security enhancements of this disclosure are particularly helpful in examples in which console 106 has the form factor of a handheld device, and is power-optimized to run on battery power.

Figure 1B:
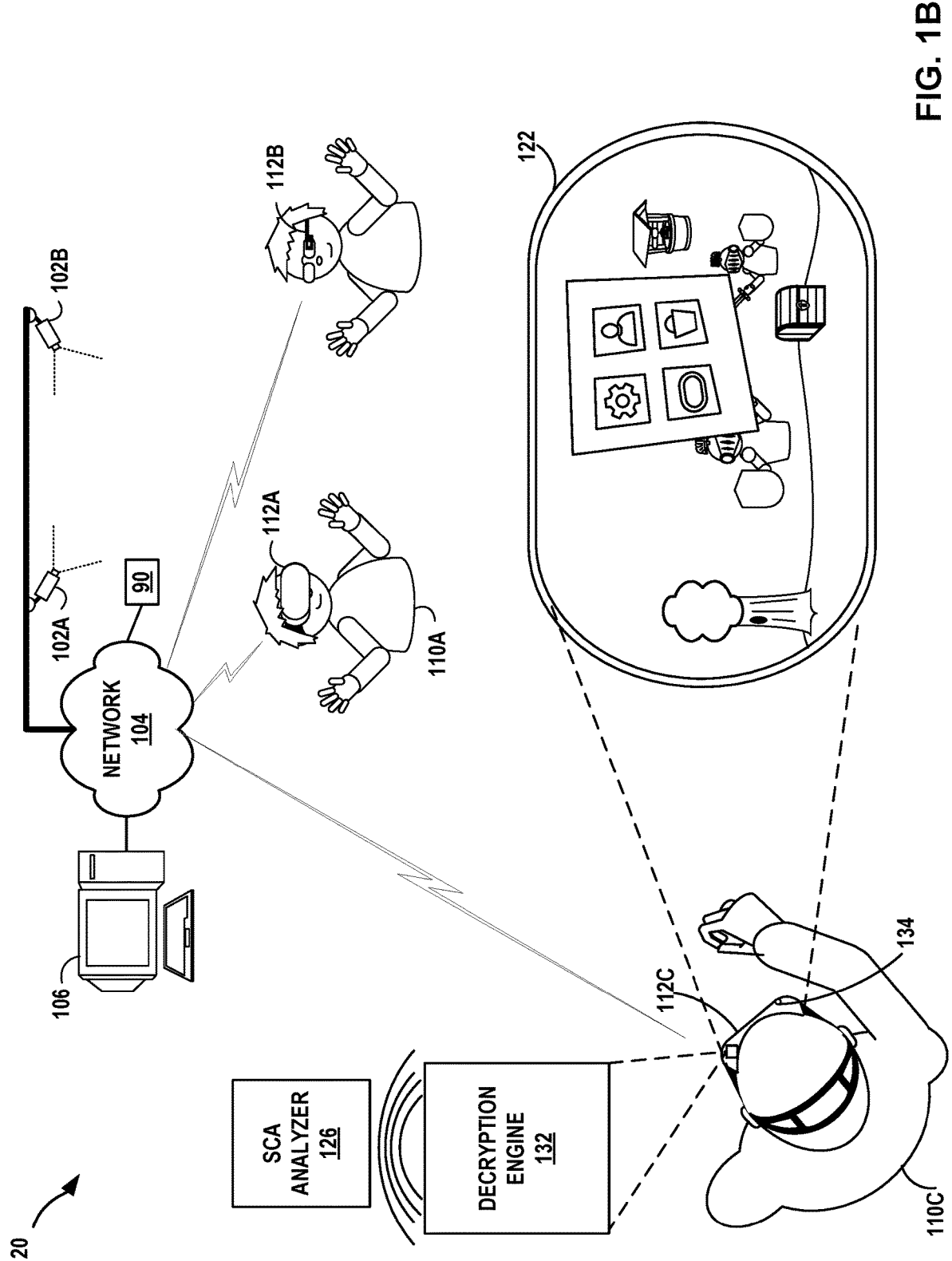
FIG. 1B is an illustration depicting another example artificial reality system that implements data-shuffled decryption, in accordance with aspects of this disclosure.

FIG. 1B is an illustration depicting another example artificial reality system 20 that implements SCA-thwarting data shuffling-based decryption in accordance with aspects of this disclosure. Bookmark not defined. Similar to artificial reality system 10 of FIG. 1A, decryption engine 132 included in HMD 112C of FIG. 1B may implement the data shuffling-based decryption techniques of this disclosure to improve data security, such as by improving resistance to SCAs performed by SCA analyzer 126. Decryption engine 132 implements the data shuffling techniques of this disclosure in a serialized manner on multiple segments of the original input data, thereby limiting energy consumption and improving wearability of HMD 112C by reducing decryption-related hardware needs.

In the example of FIG. 1, artificial reality system 20 includes external cameras 102A and 102B (collectively, "external cameras 102"), HMDs 112A-112C (collectively, "HMDs 112"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user 110. That is, in this example, the artificial reality application constructs artificial content by tracking and computing pose information for a frame of reference for each of HMDs 112. Artificial reality system 20 uses data received from cameras 102 and HMDs 112 to capture 3D information within the real-world environment, such as motion by users 110 and/or tracking information with respect to users 110, for use in computing updated pose information for a corresponding frame of reference of HMDs 112.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may each operate substantially similar to HMD 112 of FIG. 1A. HMD 112A may also operate substantially similar to HMD 112 of FIG. 1A and receive user inputs by tracking movements of hands 132A, 132B of user 110A. HMD 112B may operate similarly to HMDs 112A & 112B.

Figure 2A:
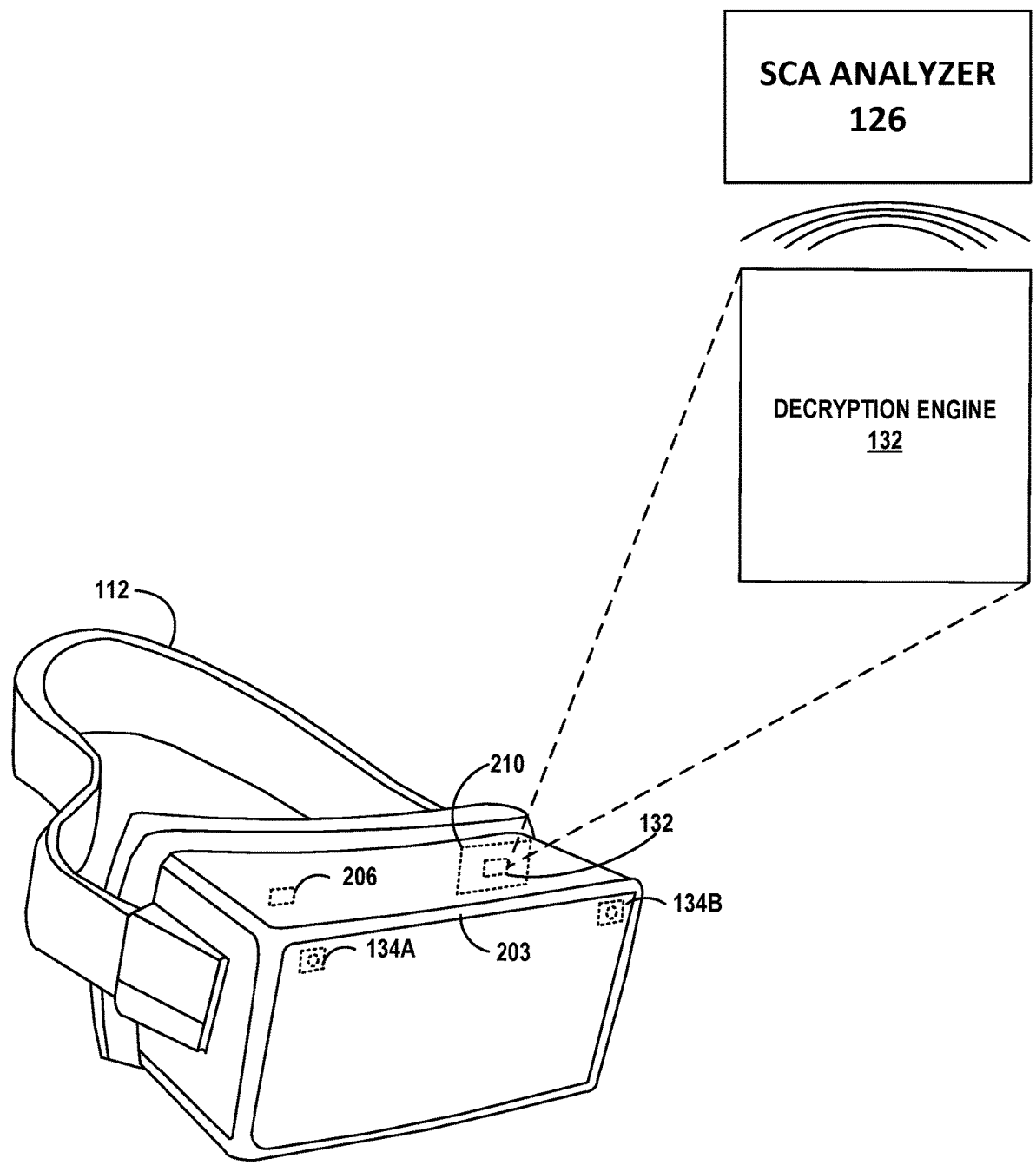
FIG. 2A is an illustration depicting an example HMD configured to decrypt and render encrypted artificial reality content in an SCA-resistant manner in accordance with the techniques of the disclosure.

FIG. 2A is an illustration depicting an example HMD 112 configured to decrypt and render encrypted artificial reality content in accordance with the techniques of the disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. In the example of FIG. 2A, HMD 112 takes the general form factor of a headset.

In this example, HMD 112 includes a front rigid body and a band to secure MD 112 to a user. In addition, MID 112 includes an interior-facing electronic display 203 configured to present artificial reality content to the user. Electronic display 203 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of MD 112, radar, or sonar that output data indicative of distances of HMD 112 from various objects, or other sensors that provide indications of a location or orientation of HMD 112 or other objects within a physical environment. Moreover, HMD 112 may include integrated image capture devices 134A and 134B (collectively, "image capture devices 134"), such as video cameras, laser scanners, Doppler® radar scanners, depth scanners, or the like, configured to output image data representative of the physical environment.

Figure 2B:
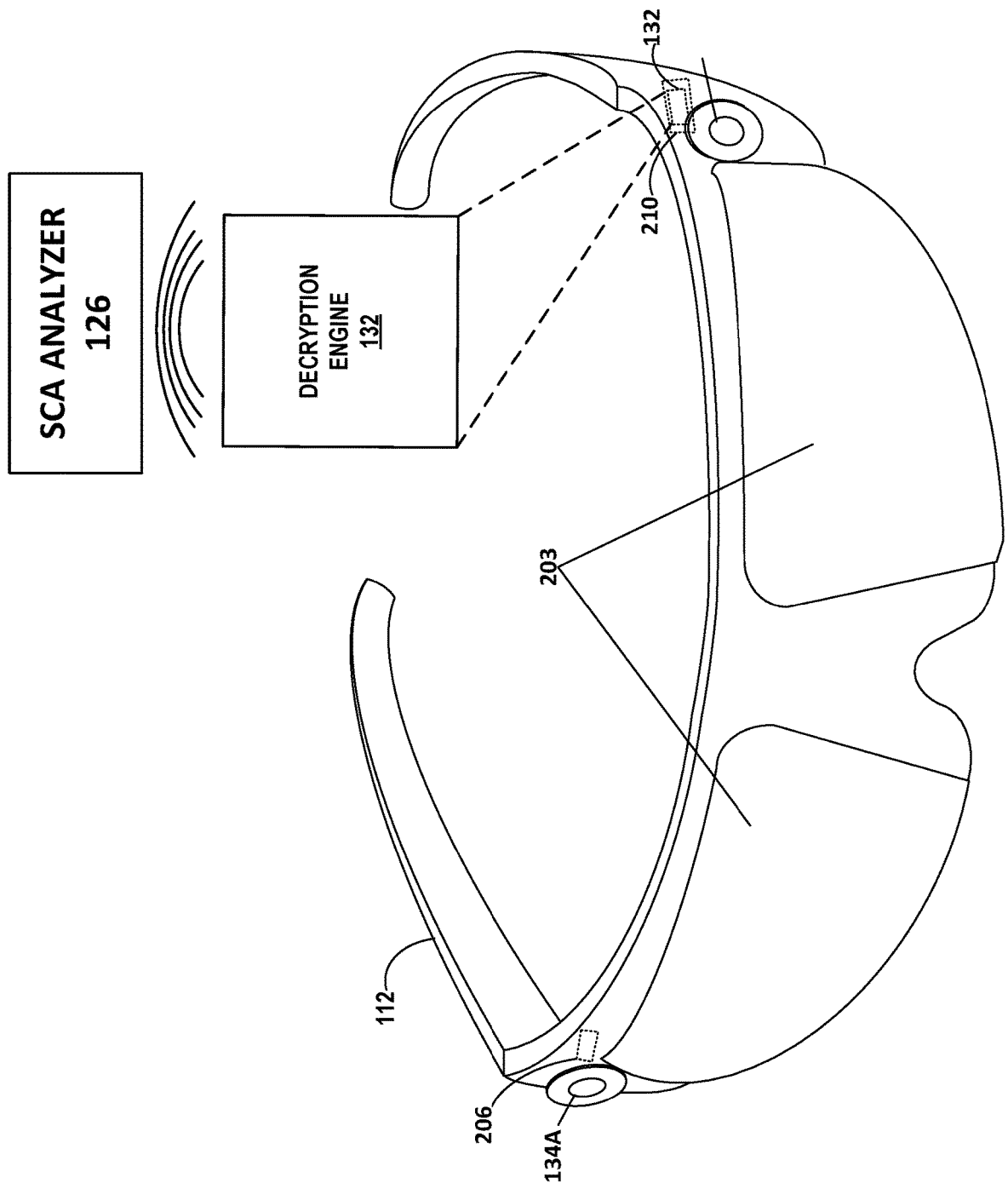
FIG. 2B is an illustration depicting another example of an MD configured to decrypt and render encrypted artificial reality content in an SCA-resistant manner in accordance with the techniques of the disclosure.

FIG. 2B is an illustration depicting another example of HMD 112 configured to operate in accordance with the techniques of the disclosure. MD 112 of FIG. 2B may be an example of any of HMDs 112 of FIGS. 1A and 1B. MID 112 may be part of an artificial reality system, such as artificial reality systems 10, 20 of FIGS. 1A, 1B, or may operate as a stand-alone, mobile artificial realty system configured to implement the techniques described herein. In the example of FIG. 2B, MID 112 takes the general form factor of glasses.

In this example, HMD 112 includes a front rigid body and two stems to secure HMD 112 to a user, e.g., by resting over the user's ears. Elements of FIG. 2B that share reference numerals with elements of FIG. 2A perform like-functionalities, and are not described separately with respect to FIG. 2B for the sake of brevity. In the example of FIG. 2B, electronic display 203 may be split into multiple segments, such as into two segments, each segment corresponding to a separate lens disposed on the rigid front body of HMD 112. In other examples in accordance with FIG. 2B, electronic display 203 may form a contiguous surface that spans both lenses and the lens-connecting bridge (i.e., the over-the-nose portion) of the rigid front body of HMD 112. In some examples in accordance with the form factor illustrated in FIG. 2B, electronic display 203 may also encompass portions of MD 112 that connect the lenses of the front rigid body to the stems, or optionally, portions of the stems themselves. These various designs of electronic display 203 in the context of the form factor of MD 112 shown in FIG. 2B improve accessibility for users having different visual capabilities, eye movement idiosyncrasies, etc.

In the examples illustrated in FIGS. 2A & 2B, internal control unit 210 of HMD 112 includes decryption engine 132 illustrated in FIGS. 1A & 1B. As described above with respect to FIGS. 1A & 1B, decryption engine 132 may be configured in accordance with aspects of this disclosure to shuffle discrete segments of data being decrypted.

FIGS. 2A & 2B also illustrate SCA analyzer 126. SCA analyzer 126 represents an SCA board (e.g., an FPGA-based board or ASIC-based board), a so-called "skimmer," or any other device configured to snoop on the performance metrics of HMD 112. Hackers may use SCA analyzer 126 to implement various types of SCAs, such as a correlation power attack (CPA). To perform a CPA, SCA analyzer 126 provides an input data set to HMD 112. A common example of a CPA involves providing one million test vectors that undergo decryption with a constant secret key, such as would be performed by an AES-compliant encryption engine that performs inverse operations to decrypt cipher text.

SCA analyzer 126 collects power traces of the AES-compliant system, and analyzes the current traces against a hypothesis that predicts the outcome for a given guess of the key. SCA analyzer 126 guesses the inverse round key one byte at a time, thereby providing 256 possibilities for every byte. SCA analyzer computes statistical correlation coefficients between the measured power traces and each hypothesis across all 256 candidate key bytes. SCA 126 selects the pairing that produces the highest correlation metric as the key guess. An important pre-processing step required for SCA 126 to compute the correlation metrics is to first align the power traces. By first aligning the power traces, SCA analyzer 126 ensures that the value of the power signature gleaned from different traces each correspond to a unique switching event in the AES SoC.

According to aspects of this disclosure, decryption engine 132 exploits the reliance of SCA analyzer 126 on the pre-processing step of aligning the power traces in order to generate the individual hypotheses corresponding to the unique power traces. Decryption engine 132 implements the SCA-thwarting techniques of this disclosure by disrupting the alignment operation that SCA analyzer 126 performs as a pre-processing step in the above-described CPA. Decryption engine 132 may shuffle or scramble the chronological sequence of the individual operations that cause each respective power-related event reflected in the power traces collected by SCA analyzer 126. By shuffling the sequence of the individual operations being analyzed by SCA analyzer 126, decryption engine 132 disrupts the correlation between the power traces gleaned by SCA analyzer 126 and the inverse cipher key that is the intended end product of the CPA.

For instance, decryption engine 132 may mix and match segments of the data (or "words") being decrypted with segments of an inverse cipher key that is applied to decipher the cipher text received from a content provider or intermediate encryption device. Decryption engine 132 may also randomize the word-key pairs using a random number generator, thereby leveraging numerous possible permutations of the word-key pairs. Because SCA analyzer 126 forms the power trace correlations relying on a particular chronological sequencing that is based on reverse engineering the AES-specified procedure to arrive at the decrypted output, decryption engine 132 implements the shuffling operations of this disclosure to provide power traces in a sequence that SCA analyzer 126 is not configured to reconstruct accurately as part of performing a CPA.

Figure 2C:
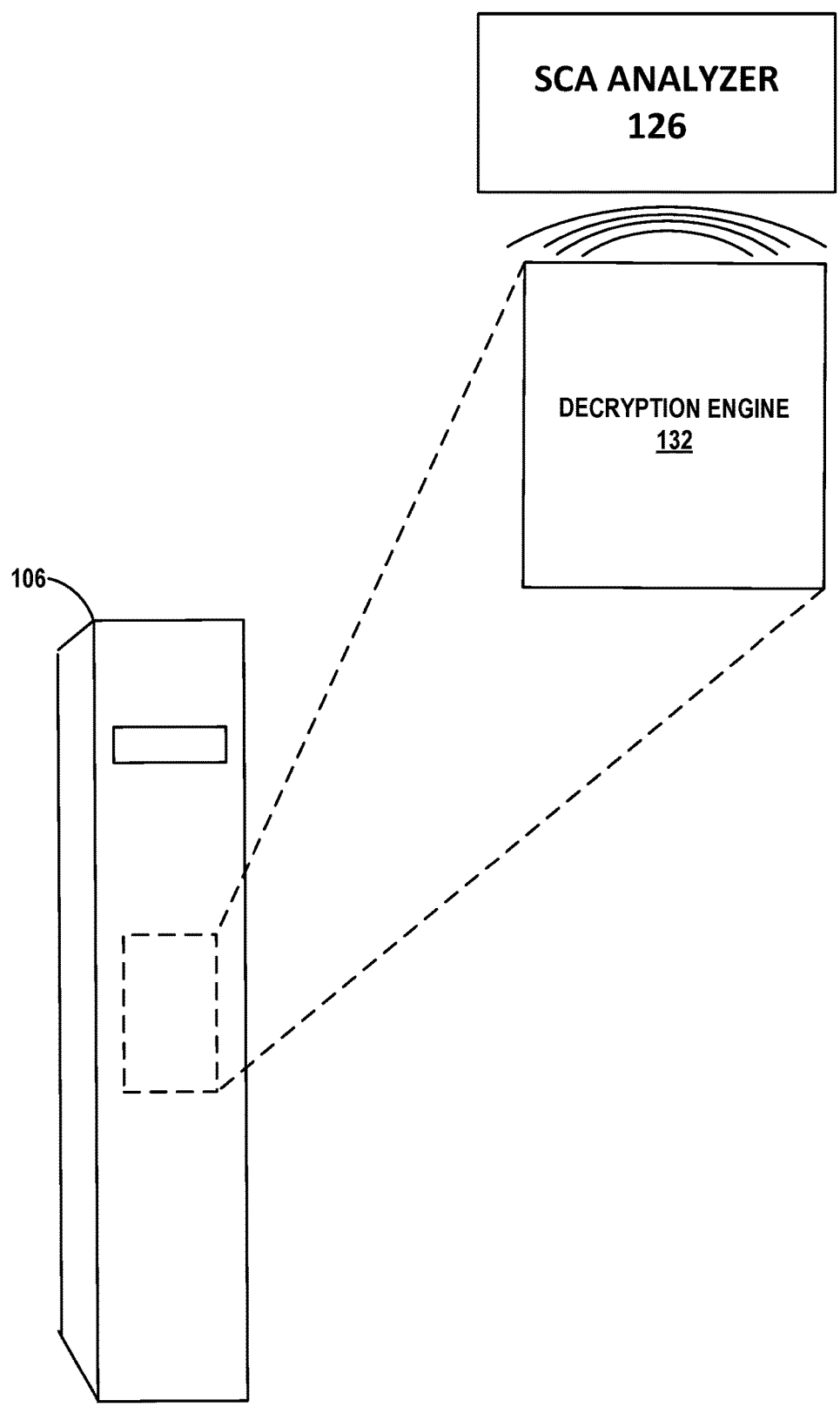
FIG. 2C is an illustration depicting an example of a console configured to decrypt and render encrypted artificial reality content in an SCA-resistant manner in accordance with the techniques of the disclosure.

FIG. 2C is an illustration depicting an example of console 106 being configured to decrypt and render encrypted artificial reality content in an SCA-resistant manner in accordance with the techniques of the disclosure. In the example illustrated in FIG. 2C, decryption engine 132 is part of console 106, instead of being implemented in HMD 112 as in the examples of FIGS. 2A & 2B. In various use case scenarios in accordance with FIG. 2C, a hacker may place SCA analyzer 126 in the vicinity of console 106 in an attempt to obtain the power traces used for a CPA. SCA analyzer 126 may carry out a CPA with significant accuracy especially in cases in which console 106 is a battery-powered handheld device that is optimized for low power usage. In these cases, console 106 may not put out large-scale power information for non-decryption operations to an extent that is sufficient to conceal the power information related to decryption information.

Decryption engine 132 may implement the in-decryption shuffling operations described above with respect to FIGS. 2A & 2B, but in the context of console 106, in the example of FIG. 2C. As such, whether implemented within HMD 112 or within console 106 that provides decrypted content to HMD 112, decryption engine 132 may implement the data shuffling-based decryption operations of this disclosure to create misalignments in the power traces collected by SCA analyzer 126, thereby disrupting the data arrangement that SCA analyzer 126 relies on to carry out a CPA. In this way, decryption engine 132 implements the techniques of this disclosure to improve data security in a variety of configurations with which artificial reality systems 10 and 20 are compatible.

Figure 3:
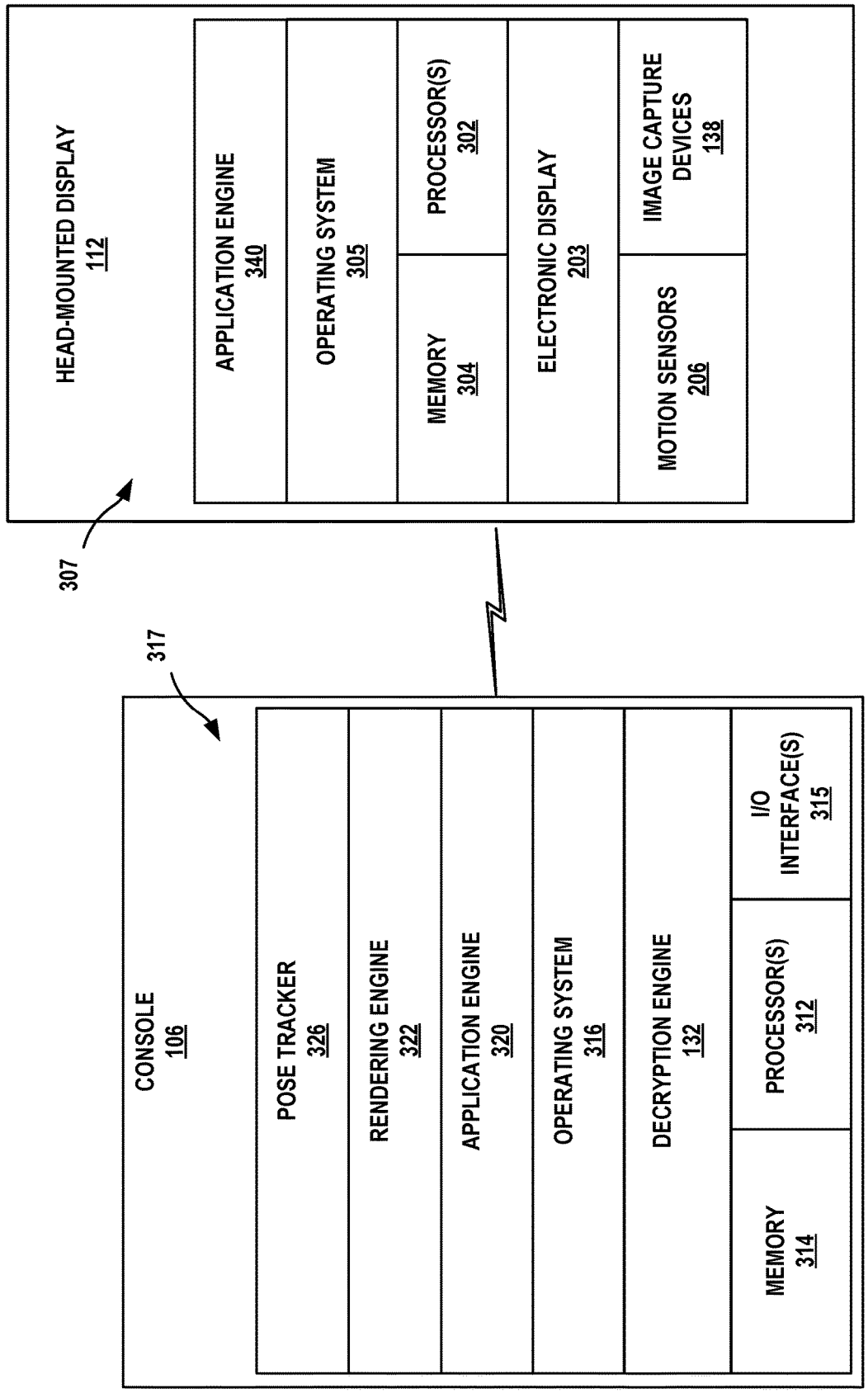
FIG. 3 is a block diagram showing example implementations of a console and an HMD of the artificial reality systems of FIGS. 1A & 1B.

FIG. 3 is a block diagram showing example implementations of console 106 and HMD 112 of artificial reality systems 10 & 20 of FIGS. 1A & 1B. In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A & 2B, processors 302 are coupled to electronic display 203, motion sensors 206 and image capture devices 134. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform motion detection, user interface generation, and various other artificial reality-related functionalities for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, WiFi®, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, and pose tracker 326. In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (shown in FIGS. 1A & 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

In the example of FIG. 3, console 106 includes decryption engine 132, which is described above with respect to FIGS. 1A-2C. For example, console 106 may receive encrypted data from an external system (e.g., an upstream streaming service), and may invoke decryption engine 132 to decrypt the encrypted data that was received. Rendering engine 322 may then render the decrypted data, and console 106 may provide the rendered data to HMD 112 in form of artificial reality content 122.

Figure 4:
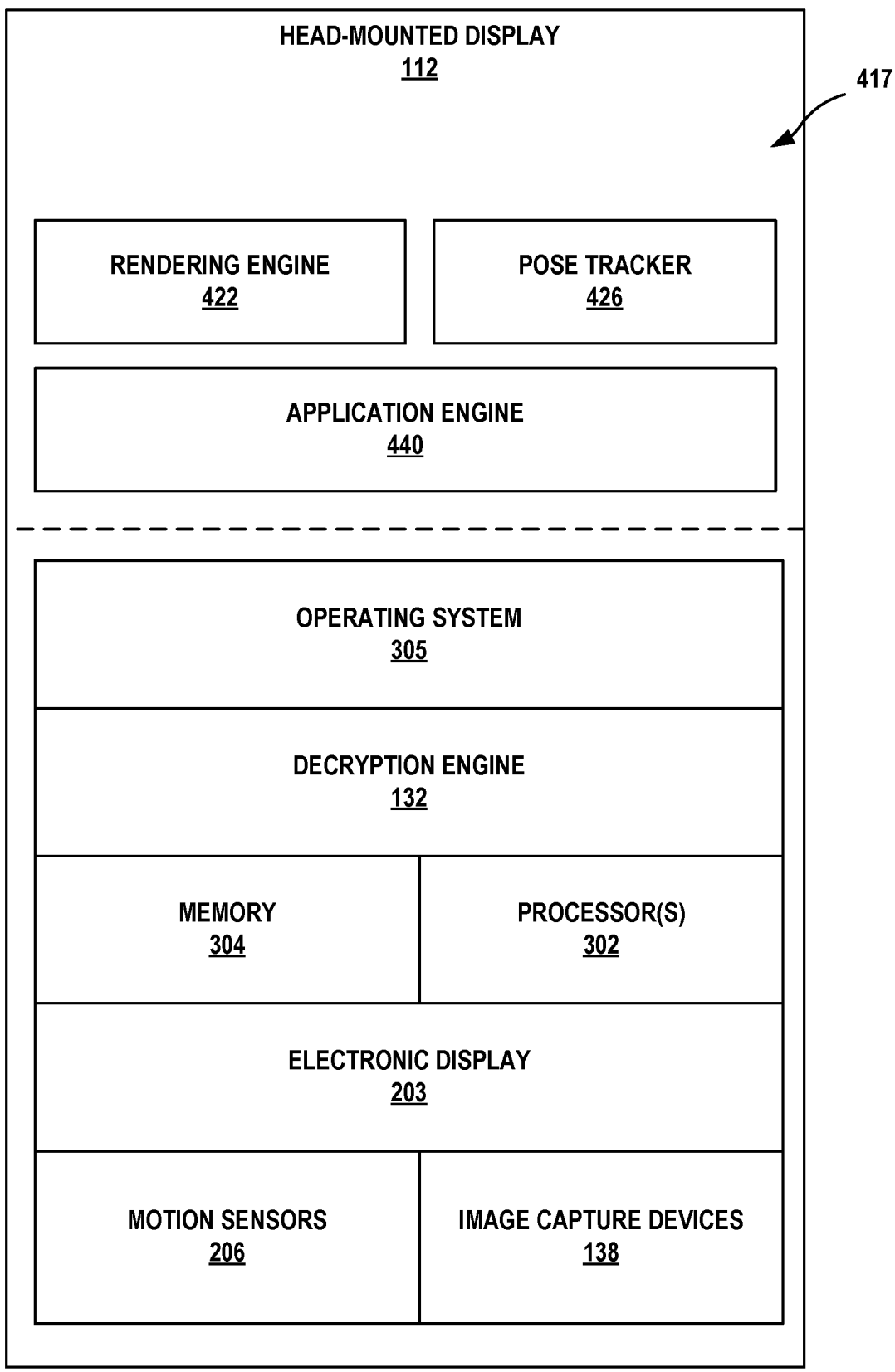
FIG. 4 is a block diagram depicting an example implementation of an HMID of the artificial reality systems of FIGS. 1A & 1B.

FIG. 4 is a block diagram depicting an example implementation of HMD 112 of artificial reality systems 10 & 20 of FIGS. 1A & 1B. In this example, as in the example of FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 134.

In the example of FIG. 4, software components 417 operate to provide an overall artificial reality application. In this example, software applications 417 include application engine 440, rendering engine 422, and pose tracker 426. In various examples, software components 417 operate similar to the counterpart components of console 106 of FIG. 3 (e.g., application engine 320, rendering engine 322, and pose tracker 326) to construct the artificial content for display to user 110. In some examples, rendering engine 422 constructs the 3D, artificial reality content which may be overlaid, at least in part, upon the real-world, physical environment of user 110.

In the example of FIG. 4, HMD 112 includes decryption engine 132, which is described above with respect to FIGS. 1A-3. For example, HMD 112 may receive encrypted data directly over network 104, or via an intermediate device, such as console 106, that may relay the encrypted data, in encrypted form, to MD 112. HMD 112 invokes decryption engine 132 to decrypt and reconstruct the encrypted data to obtain renderable data in the form of artificial reality content 122.

In the examples of both FIGS. 3 and 4, decryption engine 132 shuffles or scrambles discrete pairs of data segments and inverse cipher key segments during the data decryption process. By shuffling the data-key pairs during the decryption process, decryption engine 132 introduces misalignments into the power trace information that SCA analyzer 126 obtains to perform a pre-processing step upon which the remainder of the CPA process is based.

In these examples, decryption engine 132 serializes the decryption rounds, thereby decrypting the shuffled word-key pairs within a given decryption round. In the example of processing an AES-compliant 16-byte (128-bit) block of input cipher text, decryption engine 132 may partition the input block into four equal-length sub-blocks or "words," and perform AES decryption operations on the four words with no data interdependency between any two of the four words. That is, decryption engine 132 may decrypt each of four encrypted four-byte (32-bit) words serially and independently of one another, to decrypt the overall 16-byte encrypted input over multiple iterations. While various examples are described herein with respect to 16-byte blocks of encrypted input data ("cipher text"), it will be appreciated that decryption engine 132 may also apply these techniques with respect to other AES-compliant block sizes, such as 24-byte or 32-byte input blocks of cipher text.

In these examples, decryption engine 132 may apply a segment of the inverse cipher key to a segment of a respective four-byte word. According to the techniques of this disclosure, decryption engine 132 may shuffle the word order of the encrypted block of input data randomly before adding the relevant key segment. By randomly shuffling the order on a single-word basis, decryption engine 132 leverages twenty-four possible permutations of byte ordering arrangements. That is, because decryption engine 132 forms four words from the encrypted block of input data, the total number of possible permutations is calculated as the factorial of four, which yields a value of twenty four possible permutations. The level of randomization provided by the twenty four permutations available for each word-key pair enables decryption engine 132 to introduce significant unpredictability with respect to power trace information exhibited by the inverse cipher key addition portions of the decryption process. By introducing unpredictability with respect to the outwardly-observable power trace information while adhering to the decrypted output specified by the AES-defined decryption process, decryption engine 132 improves data security by thwarting SCAs, while maintaining data precision. While described herein with respect to being implemented on four-byte word sizes as an example, it will be appreciated that the data scrambling techniques of this disclosure are also applicable to other word sizes, such as eight-byte words, twelve-byte words, sixteen-byte words, etc.

Figure 5:
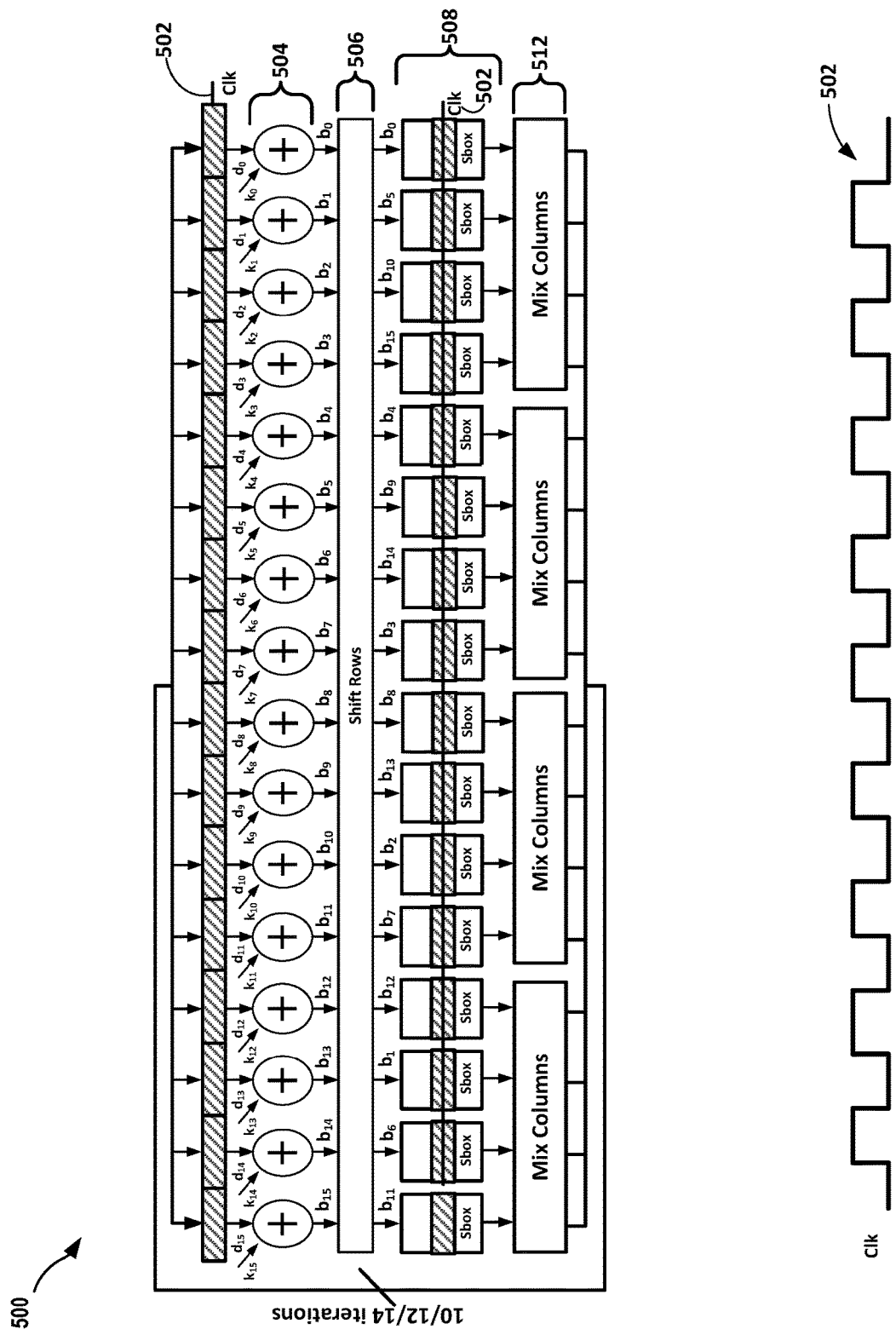
FIG. 5 is a conceptual diagram illustrating an example of AES-compliant decryption.

FIG. 5 is a conceptual diagram illustrating an example of AES-compliant decryption. The process and structure illustrated in FIG. 5 is referred to herein as AES round datapath 500. An AES-compliant encryption engine may implement AES round datapath 500 to decrypt an input block of cipher text, by performing inverse operations with respect to a reciprocal encryption datapath that generates cipher text from unencrypted input data. Various aspects of AES round datapath 500 operate according to master clock 502. The clock rate of master clock 502 is described as being at a "full frequency" in the implementation illustrated in FIG. 5. According to AES round datapath 500, a 16-byte (128-bit) input is provided, on a per-byte basis, to sixteen adder units as part of "add round key" step 504. In add round key step 504, each byte of the data input is added to a cipher key or inverse cipher key obtained using Rijndael's key schedule. Each input byte-key pair is shown in FIG. 5 using a "d-k" notation, using subscripts to delineate the different input bytes and the different inverse cipher keys.

The sixteen output bytes (denoted using a "b" notation with unique subscripts) of add round key step 504 are then shifted cyclically by various offsets in a shift rows step 506. The shift rows step 506 cyclically shifts the bytes in each row by a certain offset determined for that particular row. In the shift rows step 506, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 506 includes shifted data from a column of the input data. The right-shifting operations described with respect to shift rows step 506 are generally reciprocal to left-shifting operations that are performed by a reciprocal AES-compliant encryption datapath.

The structure of the data output by the shift rows step 506 does not permit for independently operating on separate segments of the original 16-byte input, because data produced from four different block ciphers may be included in each four-byte run of the data output by the shift rows step 506. The shift rows step 506 is an iterative process that is performed in multiple passes, which, in the particular example of FIG. 5, is a ten-iteration step.

Each respective output byte of the shift rows step 506 is then passed through a respective substitute byte (Sbox) unit as part of inverse byte substitution step 508. The decryption datapath datapath of FIG. 5 implements inverse byte substitution step 508 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution step 508 addresses non-linearity in the cipher code received as input for AES round datapath 500.

The byte-substituted outputs of the sixteen inverse Sbox units are then provided to an array of mix columns units for performance of mix columns step 512. AES round datapath 500 includes four mix columns units, each of which receives, as input, the outputs of four contiguous inverse Sbox units. As such, each mix columns unit processes a four-byte input as part of mix columns step 512. In mix columns step 512, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 512. Each mix columns unit of AES round datapath 500 processes the respective input column using matrix multiplication such that every single input byte affects all four output bytes. In a reciprocal encryption process, the combination of the reciprocal shift rows step and mix columns step provides diffusion in the cipher operation set.

As discussed above with respect to shift rows step 506, AES round datapath 500 relies on data interdependencies between the various byte units being processed, and may therefore introduce data interdependencies between byte units that are fed to different mix columns units during mix columns step 512. As shown, various steps of AES round datapath 500 are controlled by master clock 502, which, in turn, operates at full frequency throughout the lifecycle of AES round datapath 500, to provide maximum decryption throughput.

Figure 6:
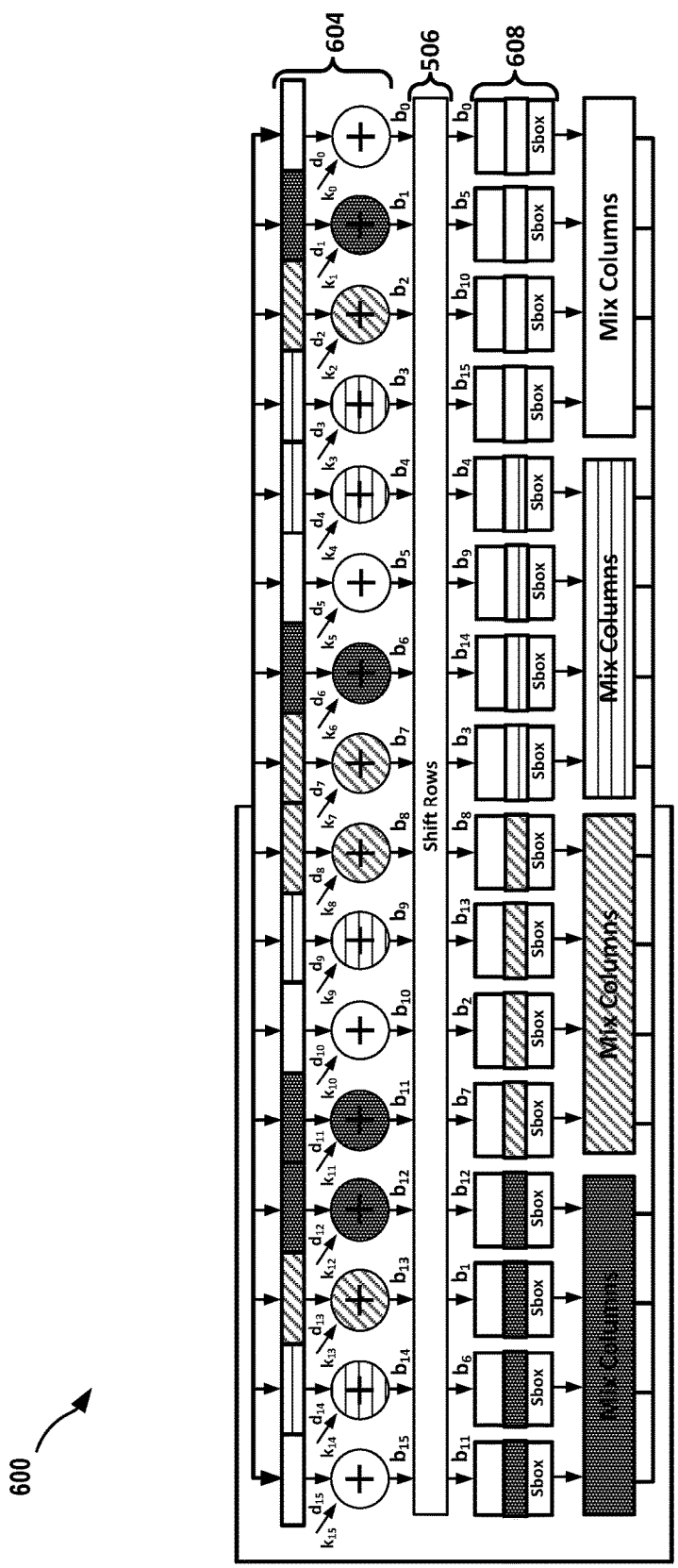
FIG. 6 is a conceptual diagram illustrating an example of partitioned AES-compliant decryption.

FIG. 6 is a conceptual diagram illustrating an example of partitioned AES-compliant decryption. The process and structure illustrated in FIG. 6 is referred to herein as partitioned AES datapath 600. Partitioned AES datapath 600 enables a decryption device to process each AES-defined block of encrypted input data in the form of discrete sub-blocks along non-interdependent sub-datapaths. Partitioned AES datapath 600 may be applied to process cipher text blocks using various AES-defined key sizes, such as 128-bit, 192-bit, or 256-bit sized key sizes. Partitioned AES datapath 600 is an example in which a decryption device may decrypt a 128-bit block of encrypted data in the form of four discrete 32-bit sub-blocks.

That is, a decryption device may partition AES round datapath 500 of FIG. 5 into four separate sub-datapaths, and may process each sub-datapath without data dependency on any other sub-datapath of the four. Partitioned AES datapath 600 enables a decryption device to maintain the data processing structure specified in the AES with respect to each sub-datapath, thereby preserving AES compliance with respect to overall decryption integrity. Partitioned AES datapath 600 illustrates that a decryption device may maintain AES compliance while limiting data interdependence to four-byte segments. That is, a decryption device may implement partitioned datapath 600 to decrypt a sixteen-byte encrypted block in discrete four-byte segments or "silos."

For example, according to partitioned AES datapath 600, a decryption device may implement the AES-specified steps of round key derivation, round key addition, inverse byte substitution, and linear mixing, but may implement this AES-compliant series of processing steps with respect to four separate 32-bit sub-blocks of each 128-bit block received as an encrypted input. That is, a decryption device may obtain a round key from an inverse cipher key schedule (e.g., Rijndael's key schedule) and add each byte (eight-bit sequence) of each 32-bit sub-block to a respective block of the obtained round key, using a bitwise XOR operation.

The partitioning of the sixteen-byte data input and the application of the individual inverse round keys are collectively shown in partitioned AES datapath 600 as partitioned inverse cipher key addition step 604. A decryption device may implement partitioned inverse cipher key addition step 604 of this disclosure by dividing the original sixteen-byte block of encrypted input data into four categories, with exactly four bytes of the original encrypted input being assigned to each category. The four categories are shown in partitioned inverse cipher key addition step 604 by way of a unique shading pattern for each category. As shown in FIG. 6, a decryption device may partition the original sixteen-byte encrypted input such that the first contiguous four-byte run includes one byte of each category, as is the case with each of the second, third, and fourth contiguous four-byte runs.

A decryption device may use a different arrangement of categories within each contiguous four-byte run, as shown by the right-shifted pattern of the shading arrangements in each consecutive four-byte run in partitioned round key addition step 604. The adder units are shaded in FIG. 6 in coordination with the corresponding category of the respective encrypted input byte. A decryption device may arrange the categories in the illustrated sequences in each four-byte run in such a way that the AES-specified shift rows step 506 produces an output in which all four bytes of each category are arranged in contiguous four-byte sequences, upon completion of the shifting operations of shift rows step 506. After completion of the round key addition, a decryption device may perform a transposition step by cyclically shifting the last three rows of each 32-bit sub-block by a certain number of steps. The transposition step is also referred to as a "shift rows" or "shiftrows" operation in accordance with the AES.

After completing the shifting operations of shift rows step 506, a decryption device may pass each 32-bit sub-block through inverse substitute byte (Sbox) stage 608. According to the AES-defined decryption process, a decryption device may implement inverse Sbox stage 608 by using a lookup table (LUT). After completion of the byte substitution in inverse Sbox stage 608, the decryption device implements a MixColumns step, in which the decryption device performs inverse linear transformation operations with respect to the data output by the multiple inverse Sbox units.

That is, each mix columns unit of a decryption device performs the inverse linear transformation operations using, as inputs or operands, the shifted, byte-substituted data received from a sub-group of inverse Sbox units shown FIG. 6 as part of inverse Sbox stage 608. In compliance with AES-defined technology, each mix columns unit of the decryption device performs matrix multiplication, using a four-byte input received from four inverse Sbox units, as one operand, and a predetermined fixed matrix, as set forth in the AES.

As described above, partitioned AES datapath 600 enables a decryption device to partition the original 128-bit encrypted data block input into four discrete, equally-sized sub-blocks, and to operate independently on each of the resulting 32-bit (i.e. four-byte) encrypted sub-blocks without cross-dependency of data operations. Because the AES specifies a four-byte input for each mix columns unit, a decryption device implements four mix columns units with respect to each 128-bit data input. In accordance with the partitionable decryption data pipeline technology shown in FIG. 6, a decryption device may provide each mix columns unit with an input corresponding to a discrete four-byte sequence that was partitioned in a non-interdependent way before inverse round key addition. That is, a decryption device may use partitioned AES datapath 600 to perform the inverse linear transformation separately on four discrete four-byte sub-blocks, without any data interdependency between any two of the four mix columns operation sets being implemented. As such, FIG. 6 illustrates that decryption devices may maintain AES compliance while limiting data interdependency to remain within the confines of each respective four-byte segment.

According to partitioned AES decryption datapath 600, a decryption device may process each four-byte encrypted sub-block independently, because each of the four-byte sub-blocks is: (i) ciphered using a round key that is not derived from the round key used for any other sub-block; (ii) passed through individual one-byte Sbox units; and (iii) grouped for the mix columns transposition on a per-round key basis. In this way, FIG. 6 illustrates that a decryption device may be configured to encrypt each four-byte sub-block without any data interdependencies between the respective encryption operations being performed for any two of the four-byte sub-blocks. Data decryption techniques of this disclosure exploit the ability to maintain AES compliance while limiting data interdependency to remain within discrete four-byte silos without crossing inter-silo partitions. For example, configurations of this disclosure may leverage the four-byte limit on data interdependency to reduce the size of the hardware round for decryption engines, such that the reduced-hardware decryption engines need only process four bytes at a time while decrypting encrypted data in compliance with the AES.

Figure 7:
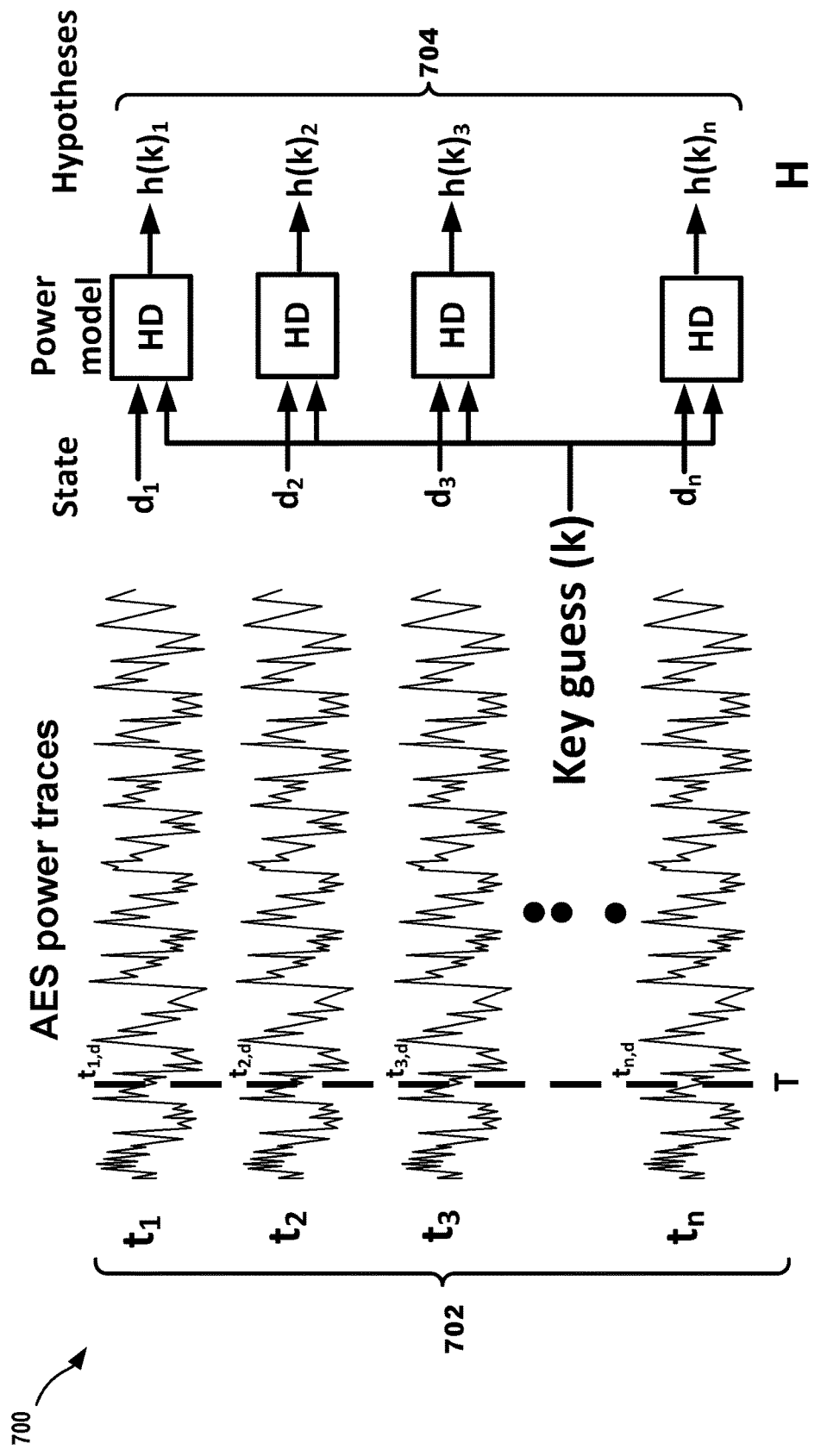
FIG. 7 is a conceptual diagram illustrating aspects of a correlation power attack (CPA).

FIG. 7 is a conceptual diagram illustrating aspects of a correlation power attack (CPA) 700. CPA 700 represents an attack that SCA analyzer 126 may perform. SCA analyzer 126 may provide a number of sixteen-byte test inputs to decryption engine 132, and snoop on the power traces exhibited by the device (e.g., UMD 112 or console 106) that implements decryption engine 132 while decrypting the test inputs. In many examples, SCA analyzer 126 provides one million test vectors in carrying out CPA 700.

SCA analyzer 126 maintains timestamps for the input times of the various test inputs to decryption engine 132. The timestamps that SCA analyzer 126 maintains for the full set of test inputs is illustrated in FIG. 7 as $t_i$ through to where the subscript 'n' denotes the overall number of text inputs provided by SCA analyzer 126 (which is a value of one million in the case of many common SCA models). The underlying datasets of the respective test inputs are illustrated in FIG. 7 as $d_1$ through $d_n$. Using the respective timestamp t and the respective dataset d of a particular test input, SCA analyzer 126 conducts AES power traces 702. Again, because the AES is a publicly-available standard, potential hackers can configure SCA analyzer 126 to predict, for known input data, the expected power trace information relatively accurately.

Using datasets $d_1$ through $d_n$, SCA analyzer 126 generates key hypotheses $h(k)_1$ through $h(k)_n$ (collectively, hypotheses 704). That is, SCA analyzer 126 feeds datasets $d_1$ through $d_n$ into a key generation model. In the example of CPA 700, SCA analyzer 126 uses a hardware distance (HD) model to generate hypotheses 704 from datasets $d_1$ through $d_n$. SCA analyzer 126 also skims power traces 702 while each respective dataset d is processed by decryption engine 132. Because the data of each dataset d and the input time t of each dataset d is known to SCA analyzer 126, SCA analyzer 126 can match or determine likenesses between each AES power trace 702 and each of the 256 (calculated as $2^8$ based on the 8-bit input) possible hypotheses 704.

The overall convergence of test inputs is denoted as 'T' in FIG. 7, and the overall convergence of hypotheses 704 is denoted as 'H'. SCA analyzer 126 uses the correlation of T and H (denoted as correlation (T, H)) to predict the inverse cipher key being applied in an AES-defined decryption process. In terms of key prediction, the particular hypothesis 704 that yields the highest correlation (T, H) value tends to be correct key guess in terms of the inverse cipher key being applied in the decryption process. In some notations, the correlation (T, H) value is expressed as a prediction operation R(k), and the correct key guess of the inverse cipher key is the greatest R(k) value obtained from the iterative power trace-to-predicted key comparison operation. That is, the particular hypothesis 704 that maximizes the value of R(k) within the universe of AES power traces 702 tends to be the correct key guess with respect to the AES-decryption process illustrated in FIG. 5.

Decryption engine 132 implements the techniques of this disclosure to misalign AES power traces 702, thereby causing SCA analyzer 126 to perform CPA 700 working from inaccurately calibrated data. In this way, decryption engine 132 disrupts the execution of CPA 700, according to the techniques of this disclosure. Decryption engine 132 also maintains data precision by producing AES-compliant decrypted output, while thwarting CPA 700 and other SCAs, in accordance with the configurations of this disclosure.

As described in greater detail below with respect to FIG. 8, decryption engine 132 randomizes the sequencing of a four-byte segment formed from the original sixteen-byte input block of cipher text. For example, decryption engine 132 uses the output of a random number generator to introduce unpredictability to the power trace information that is exhibited during an inverse cipher addition process.

By randomizing the underlying operation sequence of the inverse cipher key addition portion of the AES-defined decryption process, decryption engine 132 exhibits power trace information that is misaligned in the preprocessing stage of an AES CPA process. In this way, decryption engine 132 randomizes the ordering of an early processing step of AES-defined decryption to thwart SCAs, while maintaining the data precision and AES-compliance.

Figure 8:
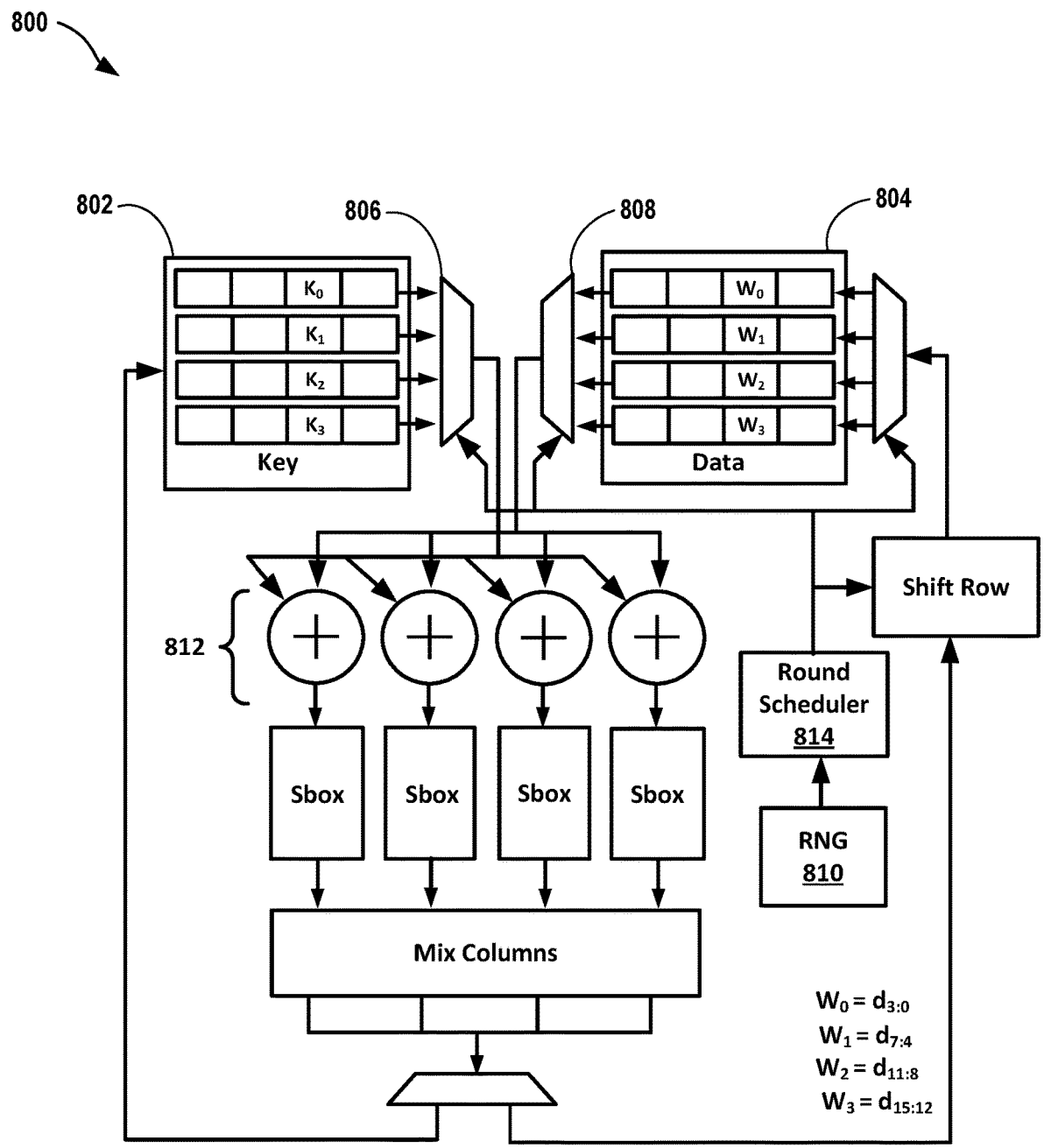
FIG. 8 is a block diagram illustrating aspects of a decryption engine that implements SCA-resistant data-shuffled decryption, in accordance with aspects of this disclosure.

FIG. 8 is a block diagram illustrating aspects of decryption engine 132 that implements SCA-resistant data-shuffled decryption, in accordance with aspects of this disclosure. The architecture of decryption engine 132 leverages the four-byte confinement of data interdependency described above with respect to FIG. 6 to reduce hardware infrastructure expended to perform the SCA-resistant decryption. Shuffled datapath 800 enables a reduced-hardware design for decryption engine 132, by processing an input block of cipher text in sequential four-byte segments. Shuffled datapath 800 of FIG. 8 represents sequential processing of four-byte words in random orders, with random key segment generation at each word transition.

Shuffled datapath 800 uses, as inputs, four discrete four-byte key segments that make up key 802, and four discrete four-byte data words that make up a sixteen-byte input block 804. Decryption engine 132 splits key 802 into respective key segments $K_0$ through $K_3$, and splits input block 804 into respective data words $W_0$ through $W_3$. To implement the data shuffling of this disclosure within shuffled datapath 800, decryption engine 132 passes the key segments through key multiplexer (MUX) 806, and passes the data words through data MUX 808.

MUXes 806 and 808 randomize the data-key pairing aspects of shuffled datapath 800 based on a round key schedule 814, which in turn, is based on the output of random number generator (RNG) 810. Round key scheduler 814 enables MUXes 806 and 808 to output one of twenty four (calculated as the factorial of four) different permutations of the four data words formed from input block 804. Round key scheduler 814 also provides randomization with respect to selecting a particular four-byte key segment formed from key 802 to be provided in combination with the randomized data word sequence to the addition units of inverse cipher key addition step 812.

Shuffled datapath 800 complies with AES round key addition results while shuffling the data words and corresponding key segments that constitute the input data of inverse cipher key addition step 812. That is, regardless of the permutation of the data words and the and the permutation of the ultimate data-key pair, the output of inverse cipher key addition step 812 remains, after four iterations, compliant with the output of an AES-compliant operation with respect to a sixteen-byte cipher text input, such as input block 804. Based on the sequential decryption of four-byte segments of input block 804 instead of the parallel decryption of four-byte segments as shown in FIG. 6, decryption engine 132 may implement shuffled datapath 800 using a reduced hardware infrastructure, such as a hardware infrastructure corresponding to just one sub-path of the four separate sub-paths illustrated in FIG. 6.

The architecture of shuffled datapath 800 allows dynamic, in-line scheduling such that the order of data-key processing for every randomized input data block, i.e. for any data word permutation that decryption engine 132 may select for a given round. According to shuffled datapath 800, decryption engine 132 selects from twenty four different permutations of data word sequencing for each AES round key application, and performs a series of four (inverse) cipher key addition cycles to complete AES-compliant decryption of the sixteen-byte input block Decryption engine 132 performs one additional cycle in each iteration, the additional cycle being dedicated to deriving the key segment for the next round using random selection based on the output of RNG 810.

Because decryption engine 132 selects the scheduling of every round from twenty four possible permutations in a random fashion, decryption engine 132 generates different power trace signatures for each unique data-key pair. The randomization output of RNG 810, when applied by round scheduler 814 with respect to the permutation selections of MUXes 806 and 808, based on the random variation provided by the RNG 810. RNG 810 is implemented in silicon, at a location that is in close proximity to MUXes 806 and 808, thereby making it more difficult for skimming or snooping devices to surreptitiously obtain round schedule 814 in time to apply round schedule to CPA 700. Each input/output path of the respective adders of inverse cipher key addition step 812 is referred to herein as an individual "data channel." As shown in FIG. 8, each data channel corresponds to a four-byte processing path, and continues through the four substitute byte (Sbox) units of shuffled datapath 800, converging at the mix columns computational stage of shuffled datapath 800.

Shuffled datapath 800 introduces misalignment in AES power traces 702 of FIG. 7. In the absence of access to the round schedule 814 value at the same dynamically-generated times, the CPA model of FIG. 7 fails because of incorrect correlation coefficient computation. The configurations of this disclosure only introduce additional multiplexers (namely, MUXes 806 and 808) to partitioned AES datapath 600, while reducing the architecture to a quarter of its original size. In this way, decryption engine 132 implements the SCA mitigation measures of this disclosure while limiting the additional logic overhead. In contrast, other existing SCA mitigation measures require voltage regulators and/or noise injection circuits, which introduce significant hardware infrastructure additions as well as greater power consumption dedicated to the SCA mitigation operations. Decryption engine 132 may implement shuffled datapath 800 in ASIC-based as well as FPGA-based architectures. Because decryption engine 132 may be deployed in artificial reality SoCs for binary decryption, DRAM content protection, non-volatile memory content protection, fuse content protection, wireless link protection etc., shuffled datapath 800 protects any of these hardware components from SCAs, such as CPA 700.

Figure 9:
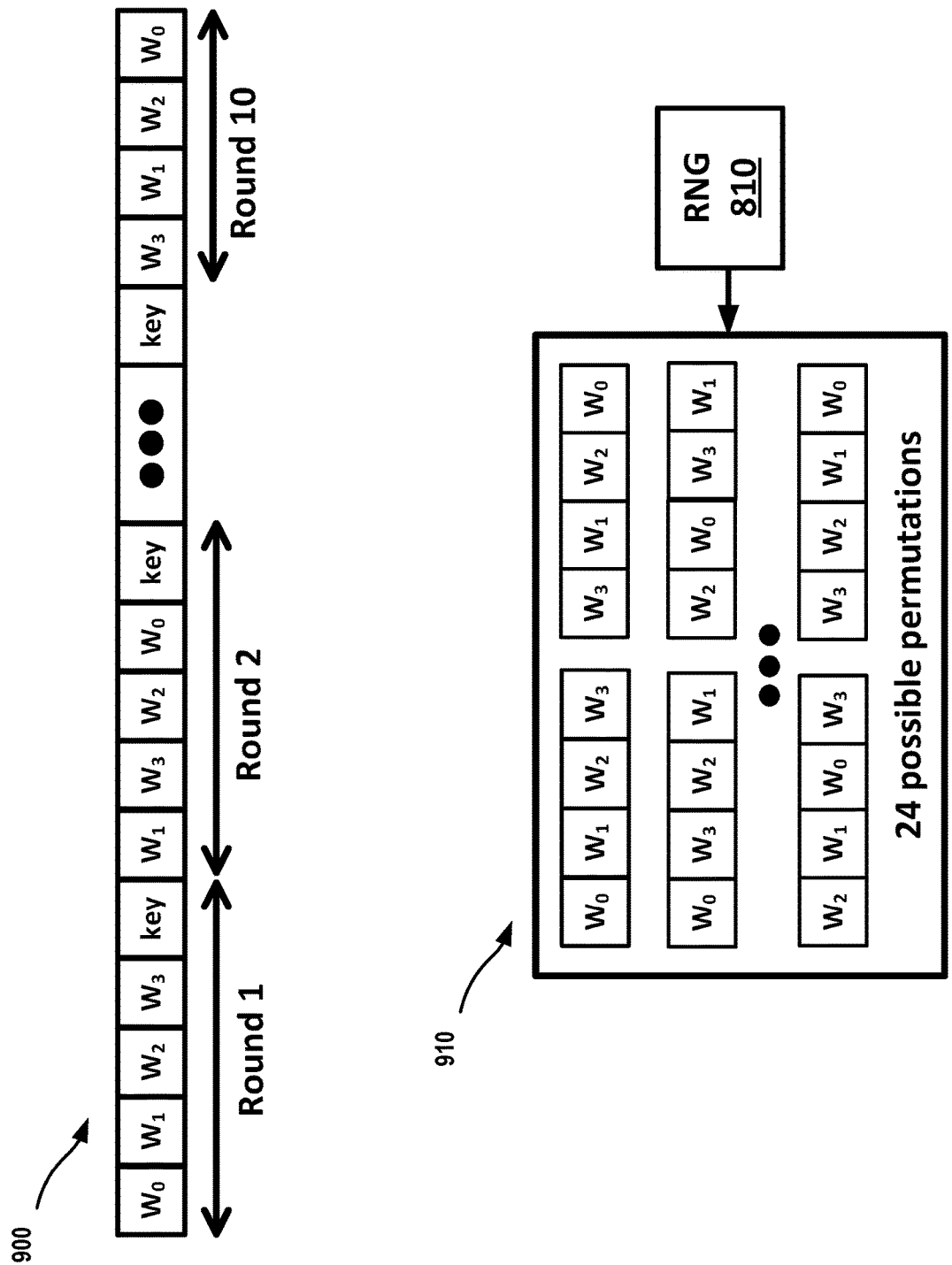
FIG. 9 is a block diagram illustrating further details of data decryption techniques that incorporate data shuffling and permutation, in accordance with aspects of this disclosure.

FIG. 9 is a block diagram illustrating further details of data decryption techniques that incorporate data shuffling and permutation, in accordance with aspects of this disclosure. Compressed round schedule 900 shows a four-cycle computation for the data words obtained from the sixteen bytes of cipher text of input block 804, with an additional cycle dedicated to deriving the respective key segment (obtained from key 802) for the next round. As shown in permutation set 910, each round can be scheduled in one out of twenty four possible ways, based on the random seed provided by RNG 810. Selecting a single permutation from the twenty four possible permutations enable decryption engine 132 to generate a unique data-key pair with a unique current (or power trace) signature on different rounds of shuffled datapath 800. Moreover, decryption engine 132 uses the randomly-varying seed value provided by RNG 810 to introduce unpredictability to the sequencing of the current traces exhibited with respect to each round of inverse cipher key addition step 812.

Figure 10:
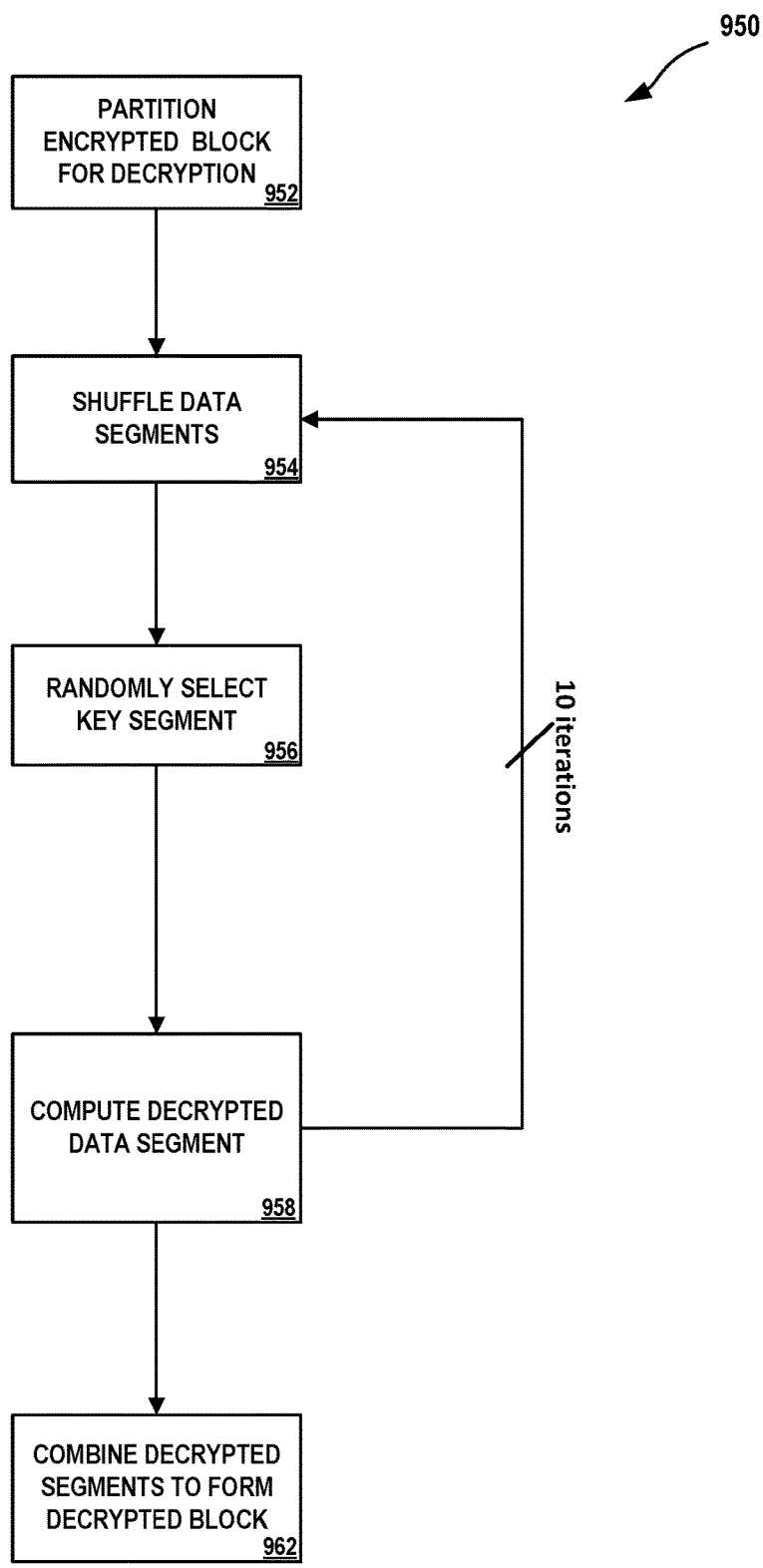
FIG. 10 is a flowchart illustrating an example process that a decryption engine may perform to thwart SCAs using the data-shuffling techniques of this disclosure.

FIG. 10 is a flowchart illustrating an example process 950 that decryption engine 132 may perform to thwart SCAs using the data-shuffling techniques of this disclosure. Decryption engine 132 may use the reduced datapath of FIG. 8 to perform process 950, thereby limiting hardware requirements for SCA-safe AES decryption. Decryption engine 132 may partition an encrypted block that decryption engine 132 obtains for AES decryption (952). For instance, decryption engine 132 may partition a sixteen-byte encrypted block to form four discrete four-byte data segments. In turn, decryption engine 132 may shuffle the data segments formed from the partitioning (954). For example, decryption engine 132 may shuffle the data segments based on a random number received from RNG 810. Said another way, decryption engine 132 may select one of the twenty four possible permutations of permutation set 910, based on a determination that the random number provided by RNG 810 is being associated with the selected permutation.

Decryption engine 132 may randomly select one of the key segments formed from key 802 (956). For example, decryption engine 132 may select the particular key segment that is associated with the random number obtained from RNG 810. In turn, decryption engine 132 may compute a decrypted data segment (958). For instance, decryption engine 132 may add the randomly-selected key segment to the shuffled data segment in a round of inverse cipher key addition step 812, and then complete the remaining computational stages of shuffled datapath 800.

Decryption engine 132 may repeat steps 954-958 for ten iterations, to iteratively compute all of the underlying data of sixteen-byte decrypted data block that corresponds to the originally-received sixteen-byte encrypted block of input data. Upon iteratively computing the sixteen bytes of underlying data in this way, decryption engine 132 may combine the iteratively-computed sixteen bytes of decrypted data to form the decrypted block (962). In various examples, decryption engine 132 may concatenate the sixteen bytes, or rearrange and concatenate the sixteen bytes to reconstruct the decrypted sixteen-byte block, as the case may be.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD- ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
   a decryption engine configured to:
   partition a block of encrypted data into a plurality of encrypted data segments;
   for each round of a plurality of rounds for decrypting the block of encrypted data:
   select, as inputs to the decryption engine, a permutation of the plurality of encrypted data segments from among a plurality of permutations of the plurality of encrypted data segments and a selected one of a plurality of inverse cipher key segments, wherein the selected permutation of the plurality of encrypted data segments is different for at least two rounds of the plurality of rounds; and
   sequentially process the plurality of encrypted data segments using the selected permutation and the selected one of the plurality of inverse cipher key segments to compute a decrypted data segment;
   the decryption engine further configured to combine the decrypted data segments computed during the plurality of rounds to form a decrypted block of data; and
   a head-mounted display (HMD) configured to output artificial reality content that includes the decrypted block of data.

2. The artificial reality system of claim 1, wherein to select the permutation of the plurality of encrypted data segments for a respective round of the plurality of rounds, the decryption engine is configured to:
   generate a random number for the respective round; and
   select the permutation of the plurality of encrypted data segments based on the random number being associated with the selected permutation of the plurality of encrypted data segments.

3. The artificial reality system of claim 2, wherein the decryption engine is further configured to, for each round of the plurality of rounds, randomly select the inverse cipher key segment based on the random number being associated with the randomly-selected inverse cipher key segment.

4. The artificial reality system of claim 1, wherein to sequentially process each of the plurality of encrypted data segments based on the selected permutation and the selected one of the plurality of inverse cipher keys to compute a decrypted data segment, the decryption engine is configured to, for each respective round of the plurality of rounds, add the encrypted data segments to the inverse cipher key segment.

5. The artificial reality system of claim 1, wherein a number of the encrypted data segments included in each respective permutation of the inputs selected from the plurality of permutations of the plurality of encrypted data segments is four.

6. The artificial reality system of claim 1, wherein the plurality of rounds for decrypting the block of encrypted data comprises ten rounds, and wherein the encrypted block of data has a length of sixteen bytes.

7. The artificial reality system of claim 6, wherein each respective encrypted data segment included in each respective permutation of the plurality of encrypted data segments has a length of four bytes.

8. The artificial reality system of claim 1, wherein the decryption engine is integrated into the HMD.

9. A head-mounted display comprising:
   a decryption engine configured to:
   partition a block of encrypted data into a plurality of encrypted data segments;
   for each round of a plurality of rounds for decrypting the block of encrypted data:
   select, as inputs to the decryption engine, a permutation of the plurality of encrypted data segments from among a plurality of permutations of the plurality of encrypted data segments and a selected one of a plurality of inverse cipher key segments, wherein the selected permutation of the plurality of encrypted data segments is different for at least two rounds of the plurality of rounds; and
   sequentially process each of the plurality of encrypted data segments using the selected permutation and the selected one of the plurality of inverse cipher key segments to compute a decrypted data segment; and
   combine the decrypted data segments computed during the plurality of rounds to form a decrypted block of data.

10. The head-mounted display of claim 9, wherein to select the permutation of the plurality of encrypted data segments for a respective round of the plurality of rounds, the decryption engine is configured to:
    generate a random number for the respective round; and
    select the permutation of the plurality of encrypted data segments based on the random number being associated with the selected permutation of the plurality of encrypted data segments.

11. The head-mounted display of claim 10, wherein the decryption engine is further configured to, for each round of the plurality of rounds, randomly select the inverse cipher key segment based on the random number being associated with the randomly-selected inverse cipher key segment.

12. The head-mounted display of claim 9, wherein to sequentially process each of the plurality of encrypted data segments based on the selected permutation and the selected one of the plurality of inverse cipher keys to compute a decrypted data segment, the decryption engine is configured to, for each respective round of the plurality of rounds, add the encrypted data segments to the inverse cipher key segment.

13. The head-mounted display of claim 9, wherein a number of the encrypted data segments included in each respective permutation of the plurality of encrypted data segments selected from the plurality of permutations of the inputs is four.

14. The head-mounted display of claim 9, wherein the plurality of rounds for decrypting the block of encrypted data comprises ten rounds, and wherein the encrypted block of data has a length of sixteen bytes.

15. The head-mounted display of claim 14, wherein each respective encrypted data segment included in each respective permutation of the plurality of encrypted data segments has a length of four bytes.

16. The head-mounted display of claim 9, wherein the apparatus is a system on a chip (SoC).

17. The head-mounted display of claim 16, wherein the SoC is configured to support an artificial reality application.

18. A method of decrypting encrypted data, the method comprising:
partitioning, by a decryption engine, a block of encrypted data into a plurality of encrypted data segments;
for each round of a plurality of rounds for decrypting the block of encrypted data;
selecting, by the decryption engine and as inputs to the decryption engine, a permutation of the plurality of encrypted data segments from among a plurality of permutations of the plurality of encrypted data segments, and a selected one of a plurality of inverse cipher key segments, wherein the selected permutation of the plurality of encrypted data segments is different for at least two rounds of the plurality of rounds; and
sequentially processing, by the decryption engine, each of the plurality of encrypted data segments using the selected permutation and the selected one of the plurality of inverse cipher key segments to compute a decrypted data segment; and
combining the decrypted data segments computed during the plurality of rounds to form a decrypted block of data.

19. The method of claim 18, wherein selecting the permutation of the plurality of encrypted data segments for a respective round of the plurality of rounds comprises:
generating, by the decryption engine, a random number for the respective round; and
selecting, by the decryption engine, the permutation of the plurality of encrypted data segments based on the random number being associated with the selected permutation of the plurality of encrypted data segments.

20. The method of claim 19, further comprising randomly selecting, for each round of the plurality of rounds, the inverse cipher key segment based on the random number being associated with the randomly-selected inverse cipher key segment.

21. An artificial reality system comprising:
a decryption engine including an encryption datapath and configured to:
partition a block of input data into a plurality of data segments;
for each round of a plurality of rounds for encrypting the block of input data:
select, as inputs to the encryption datapath, a permutation of the plurality of data segments from among a plurality of permutations of the plurality of data segments and a selected one of a plurality of cipher key segments, wherein the selected permutation of the plurality of data segments is different for at least two rounds of the plurality of rounds; and
sequentially process each of the plurality of data segments using the selected permutation and the selected one of the plurality of cipher key segments to compute an encrypted data segment;
the decryption engine further configured to combine the encrypted data segments computed during the plurality of rounds to form an encrypted block of data; and
a head-mounted display (HMD) configured to output the encrypted block of data.

22. The artificial reality system of claim 1, wherein the decryption engine comprises:
a datapath configured to sequentially process the plurality of encrypted data segments in an order determined by the selected permutation for each round of the plurality of rounds.

* * * * *